United States Patent
Jung et al.

(10) Patent No.: US 10,630,429 B2
(45) Date of Patent: Apr. 21, 2020

(54) METHOD AND APPARATUS FOR DATA RETRANSMISSION IN WIRELESS COMMUNICATION SYSTEM

(71) Applicant: Samsung Electronics Co., Ltd., Gyeonggi-do (KR)

(72) Inventors: Doyoung Jung, Gyeonggi-do (KR); Sungrok Yoon, Seoul (KR); Eunyoung Seo, Gyeonggi-do (KR); Jongho Oh, Gyeonggi-do (KR); Suyoung Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 239 days.

(21) Appl. No.: 15/710,257

(22) Filed: Sep. 20, 2017

(65) Prior Publication Data

US 2018/0091262 A1    Mar. 29, 2018

(30) Foreign Application Priority Data

Sep. 23, 2016  (KR) ........................ 10-2016-0122476

(51) Int. Cl.
| | |
|---|---|
| *H04L 1/18* | (2006.01) |
| *H04L 1/06* | (2006.01) |
| *H04L 1/20* | (2006.01) |
| *H04L 1/00* | (2006.01) |
| *H04W 72/04* | (2009.01) |

(52) U.S. Cl.
CPC .............. *H04L 1/1812* (2013.01); *H04L 1/06* (2013.01); *H04L 1/1825* (2013.01); *H04L 1/1887* (2013.01); *H04L 1/1893* (2013.01); *H04L 1/201* (2013.01); *H04L 1/0006* (2013.01); *H04L 1/1845* (2013.01); *H04W 72/0413* (2013.01)

(58) Field of Classification Search
CPC ....... H04L 1/06; H04L 1/0625; H04L 1/1812; H04L 1/1825; H04L 1/1887; H04L 1/189; H04L 1/1893
USPC ......................................................... 342/373
See application file for complete search history.

(56) References Cited

U.S. PATENT DOCUMENTS

| | | |
|---|---|---|
| 2008/0253326 A1 | 10/2008 | Damnjanovic |
| 2015/0163797 A1 | 6/2015 | Fu et al. |
| 2015/0349929 A1 | 12/2015 | Bhorkar et al. |
| 2017/0099120 A1* | 4/2017 | Damnjanovic ....... H04L 1/1822 |
| 2018/0083694 A1* | 3/2018 | Rajagopalan ...... H04B 7/18513 |

* cited by examiner

*Primary Examiner* — Dao L Phan
(74) *Attorney, Agent, or Firm* — The Farrell Law Firm, P.C.

(57) ABSTRACT

There is provided a method of retransmission for a base station in a wireless communication system supporting beamforming. The method includes transmitting data at least once using a first beam; detecting a link disconnection within a retransmission request interval at the media access control (MAC) layer; determining, when a link disconnection is detected, a second beam; and retransmitting the data using the second beam.

16 Claims, 30 Drawing Sheets

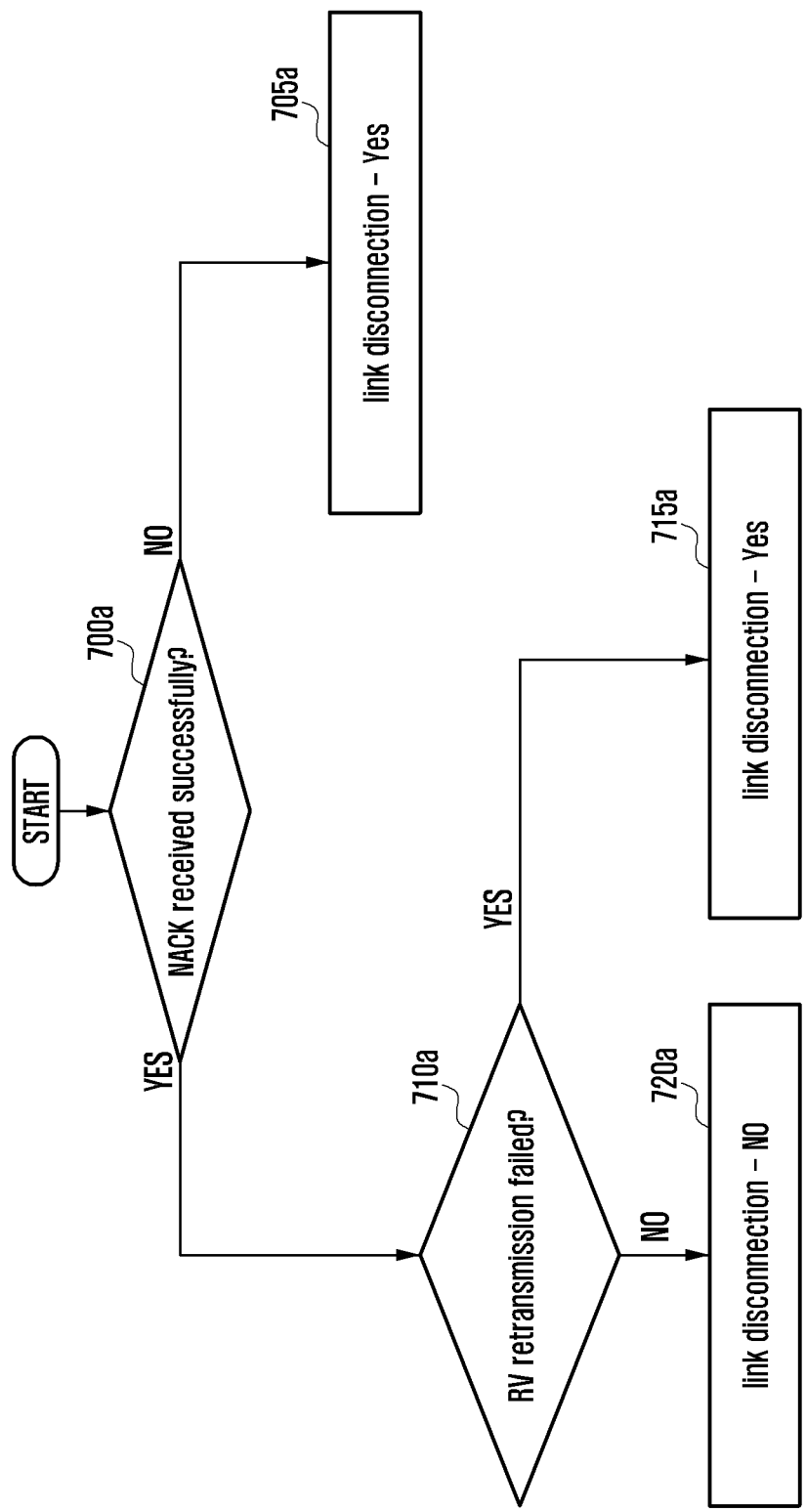

FIG. 8B

| To<br>From | 1 | 2 | 3 | 4 | 5 |
|---|---|---|---|---|---|
| 1 | 0 | 0.5 | 0.2 | 0.1 | 0.2 |
| 2 | 0.7 | 0 | 0.1 | 0 | 0.2 |
| 3 | 0.1 | 0.3 | 0 | 0.2 | 0.4 |
| 4 | 0.8 | 0 | 0.1 | 0 | 0.1 |
| 5 | 0.3 | 0.2 | 0.2 | 0.3 | 0 |

(1920)  (1925)

METHOD AND APPARATUS FOR DATA RETRANSMISSION IN WIRELESS COMMUNICATION SYSTEM

PRIORITY

This application claims priority under 35 U.S.C. § 119(a) to Korean Patent Application Serial No. 10-2016-0122476, which was filed in the Korean Intellectual Property Office on Sep. 23, 2016, the entire content of which is incorporated herein by reference.

BACKGROUND

1. Field of the Disclosure

The present disclosure generally relates to a method and apparatus for data retransmission using beamforming in a wireless communication system.

2. Description of the Related Art

Since the commercial deployment of 4G communication systems, to meet the ever increasing demand for wireless data traffic, efforts have been made to develop improved 5G or pre-5G communication systems. 5G or pre-5G communication systems are also called "beyond 4G network" or "post LTE system". To achieve higher data rates, 5G communication systems consider not only frequency bands below 6 GHz but also frequency bands above 6 GHz. For example, utilization of the mmWave band (e.g., 60 GHz band) is being considered to implement 5G communication systems. To decrease path loss and increase transmission distance in the mmWave band, various technologies including beamforming, massive multiple-input multiple-output (massive MIMO), full dimensional MIMO (FD-MIMO), array antennas, analog beamforming, and large scale antennas are being considered for 5G communication systems.

To improve system networks in 5G communication systems, technology is being developed to evolve small cells, advance small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid frequency shift keying (FSK) and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of things (IoT) where distributed elements both process and exchange information. There has also emerged the Internet of everything (IoE) technology that combines IoT technology with big data processing technology through connection with cloud servers. To realize IoT services, base technologies such as sensing, wired/wireless communication, and network infrastructure, service interfacing and security are needed, and technologies interconnecting things such as sensor networks, machine-to-machine (M2M) or machine type communication (MTC) are being developed. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, healthcare, smart consumer electronics, and advanced medical services.

Accordingly, various attempts are being made to apply 5G communication systems to IoT networks. For example, sensor networks and M2M or MTC are being realized with 5G communication technologies including beamforming, MIMO, and array antennas. Application of cloud RANs to big data processing described above may be an instance of convergence of 5G communication technology and IoT technology.

Meanwhile, in a 5G communication system, beamforming may be used to improve the transmission range and signal quality, and a retransmission technique may be used to improve the wireless transmission performance. In this case, it is necessary to enhance the retransmission success rate and QoS performance by combining beamforming and retransmission techniques.

SUMMARY

Accordingly, an aspect of the present invention is to provide a method and system that improve quality of service (QoS) performance and transmission control protocol (TCP) performance by increasing the probability of retransmission success during data retransmission in a wireless communication environment.

In accordance with an aspect of the present disclosure, a method of retransmission for a base station (BS) in a wireless communication system supporting beamforming, includes transmitting data at least once using a first beam; detecting a link disconnection within a retransmission request interval at a media access control (MAC) layer; determining, when the link disconnection is detected, a second beam; and retransmitting the data using the second beam.

In accordance with an aspect of the present disclosure, a method of retransmission for a terminal in a wireless communication system supporting beamforming, includes transmitting data at least once using a first beam; detecting a link disconnection within a retransmission request interval at a MAC layer; determining, when a link disconnection is detected, a second beam; and retransmitting the data using the second beam.

In accordance with an aspect of the present disclosure, a base station in a wireless communication system supporting beamforming, includes=a transceiver to send and receive a signal; and a controller to control transmitting data at least once using a first beam, detecting a link disconnection within a retransmission request interval at a MAC layer, determining, when a link disconnection is detected, a second beam, and retransmitting the data using the second beam.

In accordance with an aspect of the present disclosure, a terminal in a wireless communication system supporting beamforming, includes a transceiver to send and receive a signal; and a controller to control transmitting data at least once using a first beam, detecting a link disconnection within a retransmission request interval at a MAC layer, determining, when a link disconnection is detected, a second beam, and retransmitting the data using the second beam.

BRIEF DESCRIPTION OF THE DRAWINGS

The objects, features, and advantages of the present disclosure will be more apparent from the following detailed description taken in conjunction with the accompanying drawings, in which:

FIGS. 7A and 7B are flowcharts illustrating detecting a link breakage according to embodiments of the present disclosure;

FIG. 8B illustrates a TPM table between beams according to an embodiment of the present disclosure;

DETAILED DESCRIPTION

Figure 1:
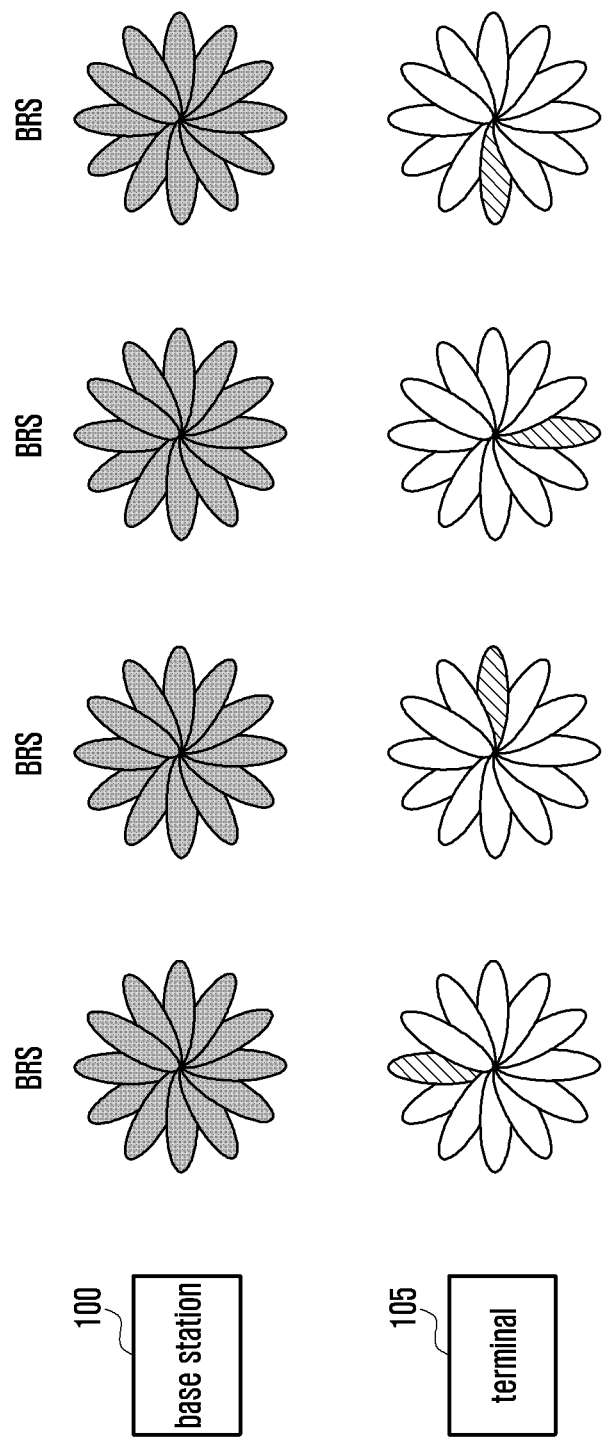
FIG. 1 depicts beam training in a 5G communication system supporting beamforming.

Hereinafter, various embodiments of the present disclosure are described in detail with reference to the accompanying drawings. It should be appreciated that the present disclosure is not limited to a specific embodiment and all modifications, equivalents and/or alternatives thereof also belong to the scope of the present disclosure. The same or similar reference symbols may be used throughout the drawings to refer to the same or like parts.

In the present disclosure, the expressions "have", "may have", "include" or "may include" indicate the existence of a specific feature (e.g., function, operation, or component) and do not exclude the existence of other features. It is thus to be interpreted as specifying the presence of the stated features, numbers, steps, operations, elements, components, or groups thereof, but which do not preclude the presence or addition of one or more other features, numbers, steps, operations, elements, components, or groups thereof.

In the present disclosure, the expression "A or B" may indicate all possible combinations of A and B. For example, "A or B", may indicate any of (1) including at least one A, (2) including at least one B, and (3) including at least one A and at least one B.

In the present disclosure, the terms "first" and "second" may modify various elements regardless of importance and/or order, and are used to distinguish one element from another element without limitation. For example, a first user device and a second user device may indicate different user devices regardless of the order or importance of the devices. As another example, a first component may be referred to as a second component, and vice versa, without departing from the scope of the present disclosure.

It will be understood that when a first element is referred to as being "coupled with/to" or "connected with/to" a second element, it can be coupled or connected with/to the second element directly or via a third element. In contrast, it will be understood that when a first element is referred to as being "directly coupled with/to" or "directly connected with/to" a second element, no other element intervenes between the first element and the second element.

Some terms used herein may be provided merely to describe a specific embodiment without limiting the scope of another embodiment. In the present disclosure, the singular forms "a", "an" and "the" are intended to include the plural forms as well, unless the context clearly indicates otherwise.

Terms including technical and scientific terms used herein have the same meaning as commonly understood by one of ordinary skill in the art. It will be further understood that terms, such as those defined in commonly used dictionaries, should be interpreted as having meanings that are consistent with their meaning in the context of the relevant art and are not to be interpreted in an idealized or overly formal sense unless expressly so defined herein.

In a wireless communication system (e.g., 5G communication system, and Wi-Fi system) including a plurality of nodes, one node may find an optimal beam for wireless communication with a counterpart node, and configure the optimal beam to transmit and receive data. In order to find the optimal beam a full beam sweep may be required to examine all the transmission beams and reception beams. The process of finding the optimal beam for a counterpart node is referred to as beam training.

FIG. 1 illustrates beam training in a 5G communication system supporting beamforming. FIG. 1 illustrates a periodic beam training process in a 5G cellular network using the extremely high frequency (EHF) band or mmWave band.

In a wireless system using the mmWave band, beamforming may be used to compensate for high path loss, thereby improving the transmission range and signal quality.

In beam training, a reference signal or frame for the purpose of beam training is used to perform beam sweeping for available beams, and the beams that maximize a given signal quality metric (e.g., reference signal received power (RSRP), received signal strength indicator (RSSI), Reference Signal Received Quality (RSRQ), and error vector magnitude (EVM)) are then selected to be used for transmission or reception of a data or control signal.

Beam training can be divided into a periodic beam training process and aperiodic beam training process according to the operation and execution method. The periodic beam training process does not require separate triggering, but the beamforming interval may be long due to beamforming overhead. In the aperiodic beam training process, fixed beamforming overhead does not occur, separate triggering is required, and beam training could possibly not be performed depending on link conditions.

The beam reference signal (BRS) is a signal used to measure reception power for a specific beam at the terminal 105. In a cellular network environment, a structure where a plurality of terminals perform beamforming together with one base station may be acceptable. At each BRS subframe, the base station 100 may sweep all available transmission beams, and the terminal 105 may use a fixed reception beam to measure the reception power for base station transmission beams. As a result of reception power measurement, the terminal 105 may notify the optimum transmission beam to the base station 100. The base station 100 may use the notified transmission beam to transmit data to the terminal 105. Here, the terminal 105 may select one or more beams through beam training, and may store information on the selected beams as optimum candidate beams and notify the same to the base station 100.

As described above, to select the optimal beam through beam training, the terminal reception power should be measured for all beam combinations. When the number of base station transmission beams is N and the number of terminal reception beams is M, the time required for beam training may be given by N*M*BRS period. Here, if the BRS period is short, the subframe for data transmission is reduced, and beamforming overhead becomes large. Hence, the BRS period should be appropriately determined. The beam training time can be as long as several hundred milliseconds (ms) even when a reasonable number of beams (e.g., 10 to 20) are used with an appropriate level of overhead.

Figure 2:
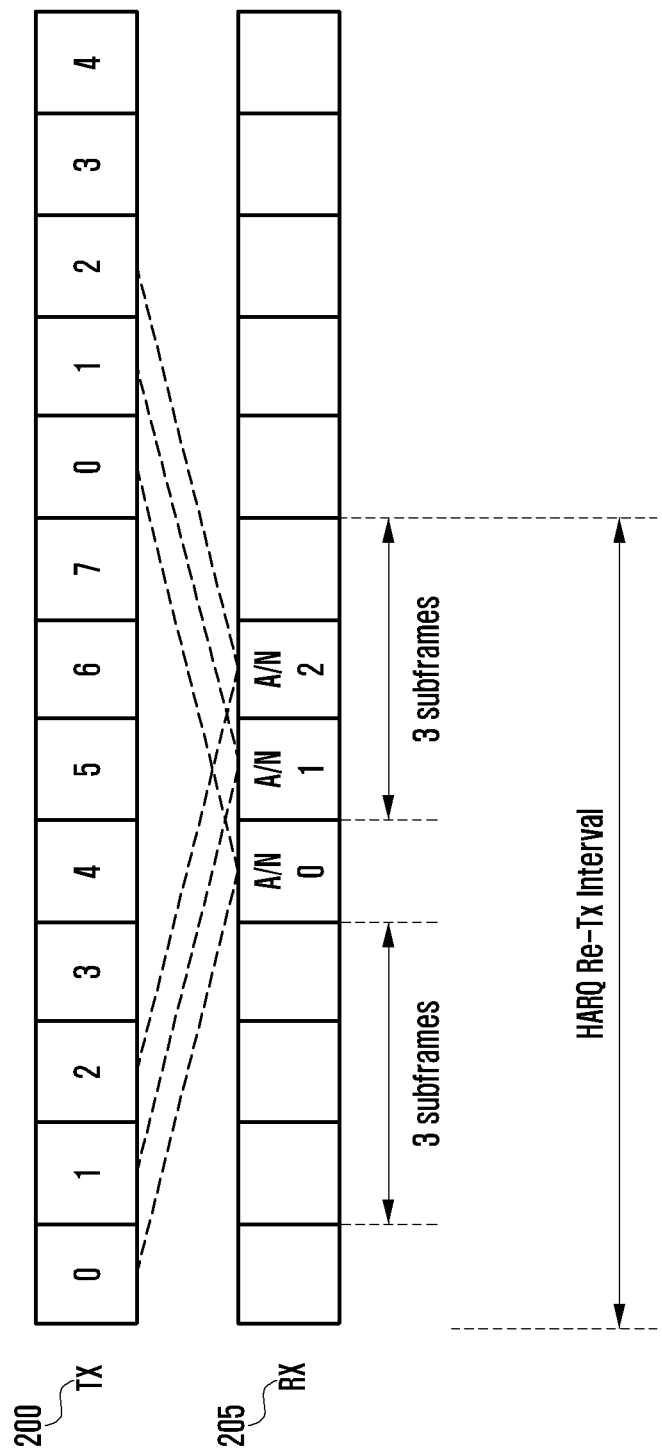
FIG. 2 illustrates hybrid automatic repeat request (HARQ) operation.

FIG. 2 illustrates a HARQ operation.

Retransmission technology is necessary for reliable communication regardless of whether the network is wired or wireless. In wireless network/communication systems, due to the nature of wireless channels, robust retransmission technology may become even more important.

In general, the communication system is composed of one or more layers, rather than a single layer, according to functions and roles. Here, although retransmission technology can be applied to each layer, retransmission at the L2 MAC layer and transmission control protocol (TCP) retransmission at the upper layer are mainly used.

In terms of reliability, it may be sufficient to use only TCP retransmission at the transport layer. However, in terms of Quality of Service (QoS) performance such as low latency, service continuity and throughput, it may be required to use efficient L2 layer retransmission with a short retransmission period, rather than transport layer TCP retransmission with a long retransmission period.

As described above, efficient L2 layer retransmission can be achieved by increasing the retransmission success ratio while maintaining a short retransmission period.

With reference to FIG. 2 depicting a HARQ retransmission in a cellular network, data is transmitted by the transmitting end 200 at subframe 0, NACK is transmitted by the receiving end 205 after 3 subframes, and HARQ retransmission can be performed by the transmitting end 200 after 3 subframes. For instance, in a 4G system, since the subframe may be 1 ms, the retransmission period may become 8 ms. While the retransmission period is longer than the Wi-Fi network, the cellular network may use many techniques to increase the retransmission success ratio.

In the cellular network, diversity technology is applied in the following three aspects that may increase the retransmission success ratio.

1) Redundancy Diversity

In addition to chase combining (CC) mode where the same data as the initial transmission is sent at the time of retransmission, incremental redundancy (IR) mode can be supported. With IR mode, it is possible to send different redundancy versions (RV) at each retransmission, and redundancy diversity may be applied to increase the probability of retransmission success.

2) Rate Adaptation

Use of adaptive HARQ technology can adaptively change the modulation and coding scheme (MCS) during retransmission, thereby increasing the probability of retransmission success.

3) Frequency/Time Diversity

The frequency/time diversity effect caused by changing the resource block of adaptive HARQ technology can increase the probability of retransmission success.

Radio link control (RLC) retransmission can be more focused on reliability and generally has a longer period than HARQ retransmission. RLC retransmission may be performed when HARQ retransmission fails.

Figure 3A:
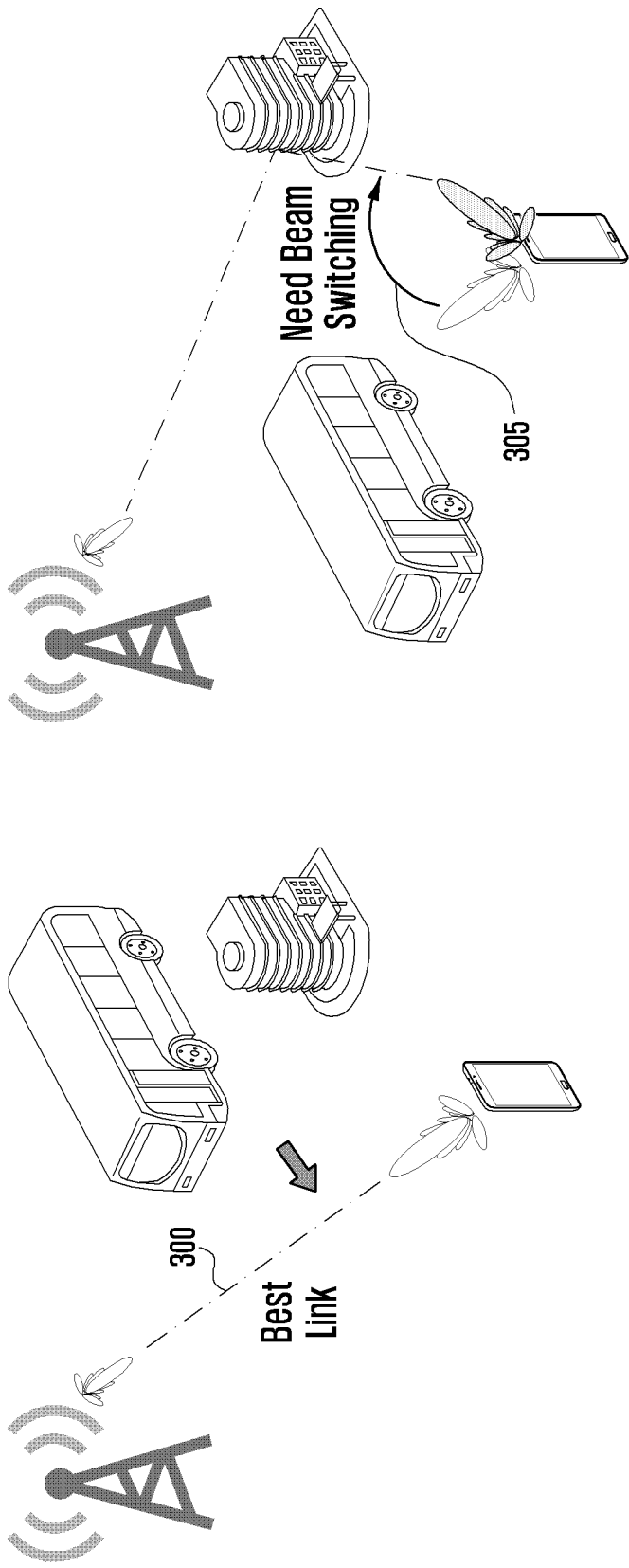
FIG. 3A illustrates a case where the link is broken due to an obstacle in a communication system supporting beamforming.
Figure 3B:
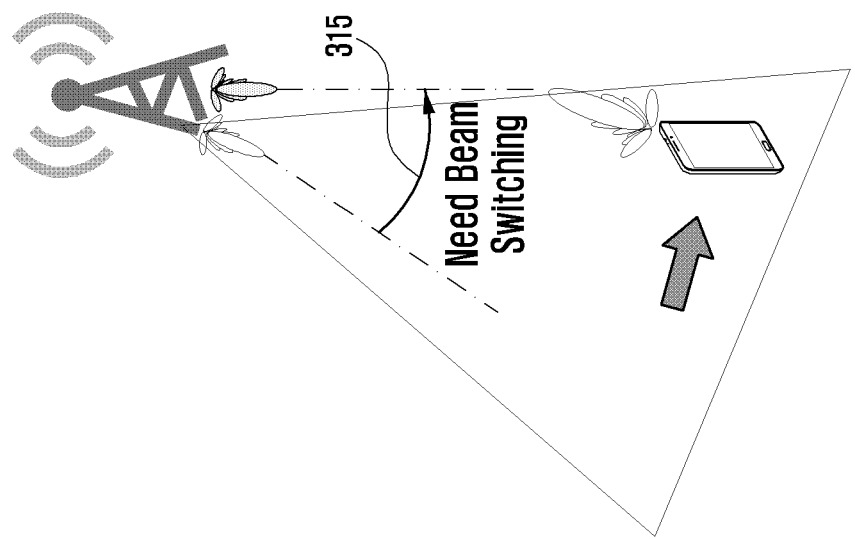
FIG. 3B illustrates a case where the link is broken due to mobility of the terminal in a communication system supporting beamforming.
Figure 3B:
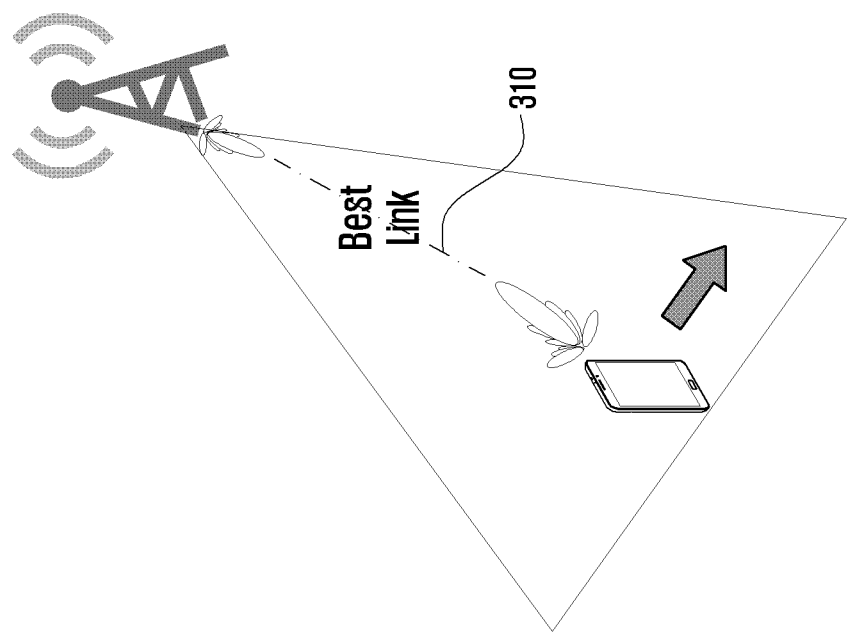

FIGS. 3A and 3B illustrate cases where the link is broken owing to an obstacle and mobility of the terminal, respectively, in a communication system supporting beamforming. Though FIGS. 3A and 3B are shown in the view of the uplink, it should be apparent that they can also be applied to the downlink.

After beam training, links 300 and 310 corresponding to the optimal beams may be formed between the terminal and the base station for data transmission and reception. However, the link 300 may be disconnected due to an obstacle as shown in FIG. 3A, and the link 310 may be disconnected due to movement of the terminal as shown in FIG. 3B. In this case, new optimum beams can be selected through periodic and/or aperiodic beam training, and data can be transmitted through new links 305 and 315 formed by the new optimal beams.

However, during data retransmission, since the retransmission period can be short, new beam training cannot be performed, and meaningless data retransmission may occur. In addition, even if optimum candidate beams have been obtained through beam training before the link disconnection, the use of such candidates for retransmission may be inappropriate in the new environment. This is because it can be highly probable that the second and third optimal beams are adjacent in the previous beam training result. Hence, even if they are used for retransmission, it is likely that they are blocked, or in bad link state.

If the retransmission fails, the corresponding data may be dropped. Such data can be delivered only through TCP retransmission at the transport layer or application level retransmission. In this process, the congestion control algorithm of TCP may have a negative effect on TCP performance.

Accordingly, there may be a need for a technique that increases the probability of retransmission success in data retransmission based on beamforming.

Figure 4:
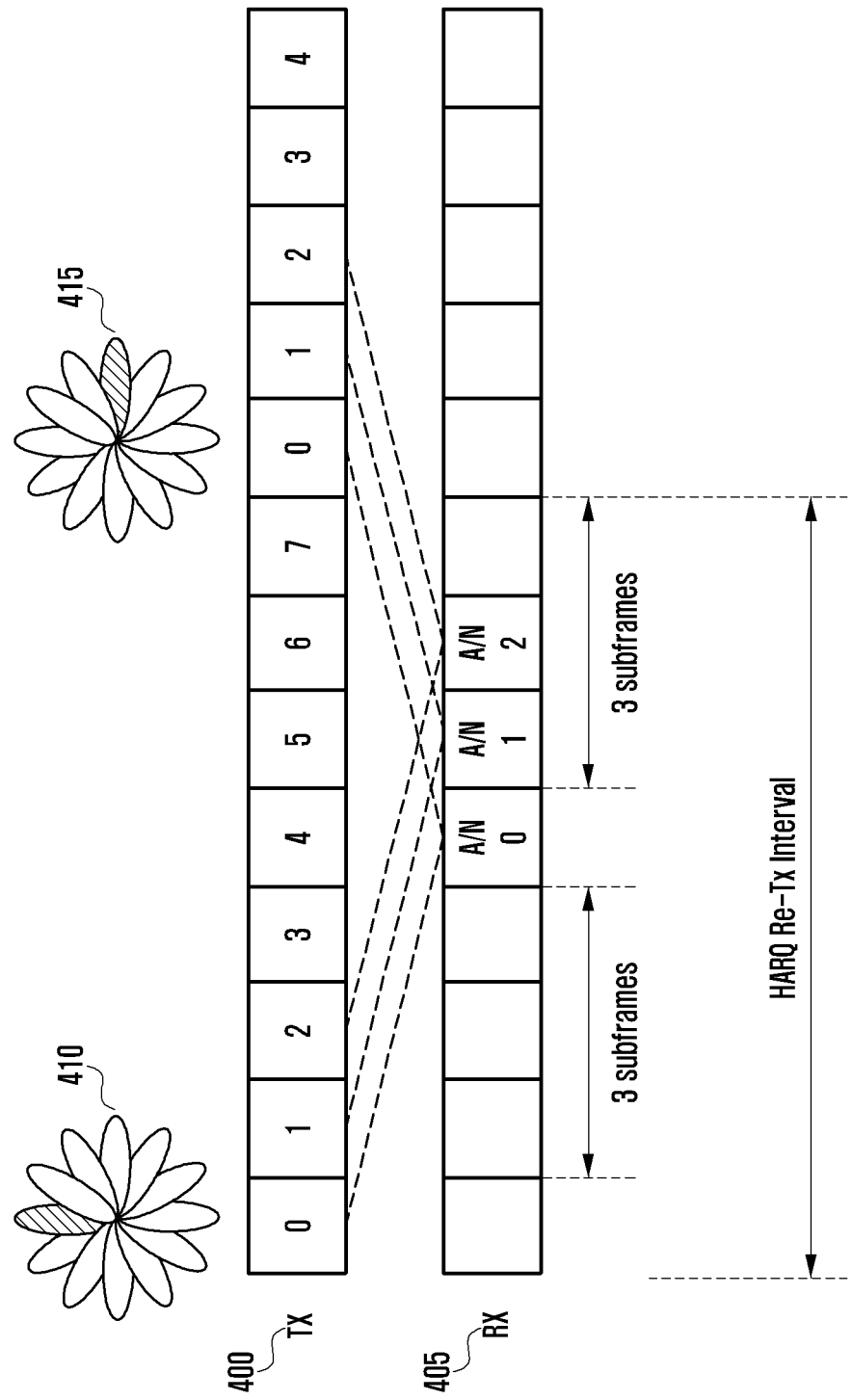
FIG. 4 illustrates HARQ-based data retransmission in a communication system supporting beamforming according to an embodiment of the present disclosure.

FIG. 4 illustrates HARQ-based data retransmission in a communication system supporting beamforming according to an embodiment of the present disclosure.

In an embodiment of the present disclosure, it is possible to change the transmission beam for retransmission in HARQ-based data retransmission. The transmitting end 400 may transmit data using the optimal beam 410 obtained as a result of the previous beam training. Here, if the receiving end 405 fails to receive the data, the receiving end 405 may transmit NACK after 3 subframes from data transmission.

The transmitting end 400 may determine whether the link is disconnected according to the NACK reception and the HARQ mode (e.g., CC mode, and IR mode). Upon determining that the link is disconnected, the transmitting end 400 may use a newly determined beam 415 for data retransmission after 3 subframes from NACK transmission. That is it may be possible to increase the retransmission success rate and the packet delivery ratio by using beam diversity in data retransmission.

Figure 5:
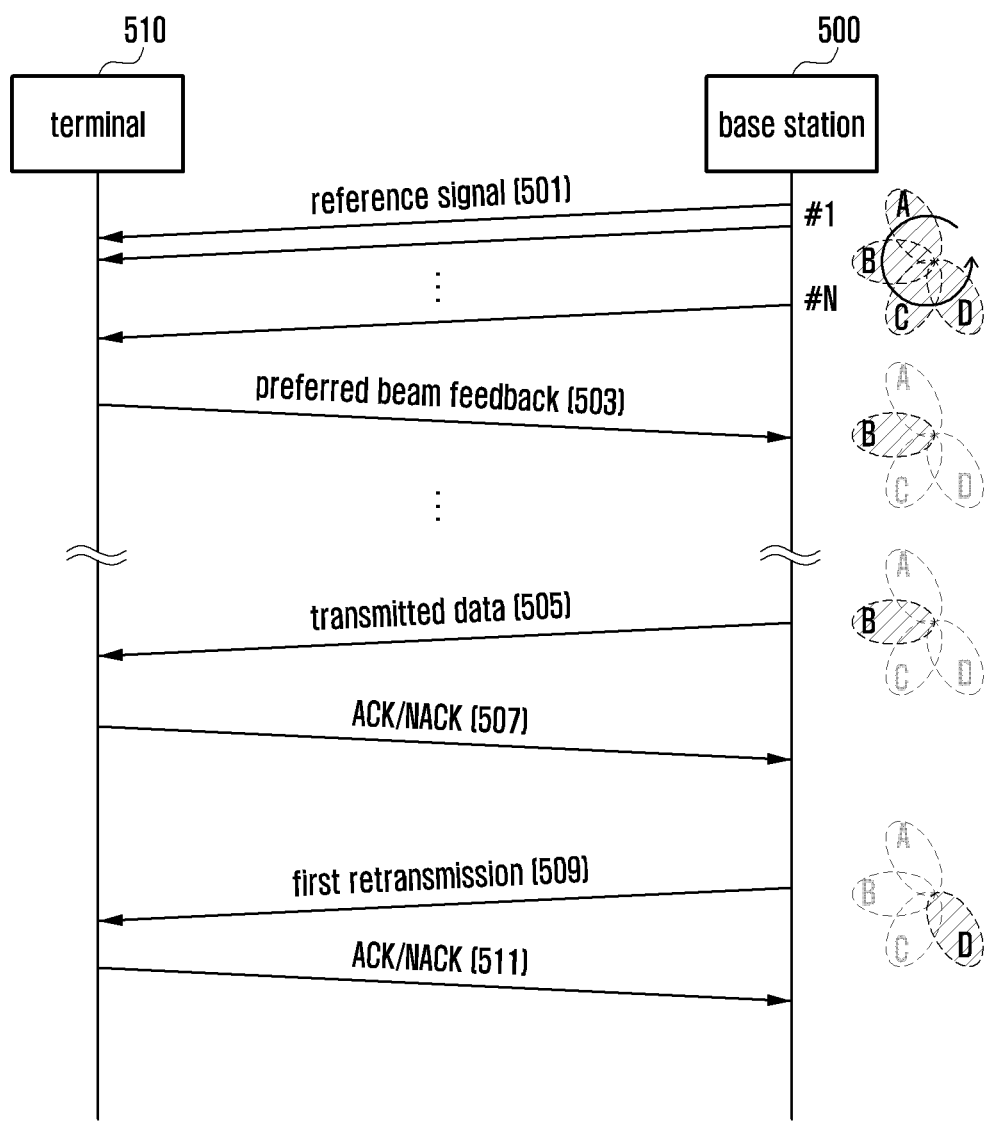
FIG. 5 is a sequence diagram illustrating HARQ-based data retransmission in a communication system supporting beamforming according to an embodiment of the present disclosure.

FIG. 5 is a sequence diagram illustrating HARQ-based data retransmission described in FIG. 4.

The base station 500 and the terminal 510 may perform periodic and/or aperiodic beam training. Specifically, at step 501, the base station 500 may send a reference signal through transmission beam sweeping, and the terminal 510 may perform full beam sweeping by examining all the transmission beams and reception beams to obtain optimal beam information for the beam pairs. Here, the terminal 510 may acquire optimal candidate beam information as well as optimal beam information. The optimal beams and optimal candidate beams may be collectively referred to as preferred beams. At step 503, the terminal 510 may send the preferred beam information to the base station 500. The preferred beam information may include only the optimal beam information, and may further include the optimal candidate beam information.

At step 505, the base station 500 may transmit data using the optimal beam information of the received preferred beam information. At step 507, the terminal 510 may transmit the base station 500 ACK/NACK corresponding to the data. The base station 500 may determine whether the link is broken or disconnected on the basis of NACK reception and the HARQ mode. Examples for determining whether the link is broken or disconnected are described in detail below.

Upon determining that the link is disconnected, at step 509, the base station 500 may determine and use a new beam to retransmit the data. The base station 500 may determine a new beam on the basis of the optimal candidate beam information and the inter-beam TPM obtained from the terminal 510. Examples for determining a new beam are described in detail later. At step 511, the terminal 510 may transmit the base station 500 ACK/NACK corresponding to the data retransmission.

In FIG. 5, it is assumed that the base station operates as the transmitting end. However, it is apparent that this embodiment of the present disclosure is also applicable to the case where the terminal operates as the transmitting end.

Figure 6A:
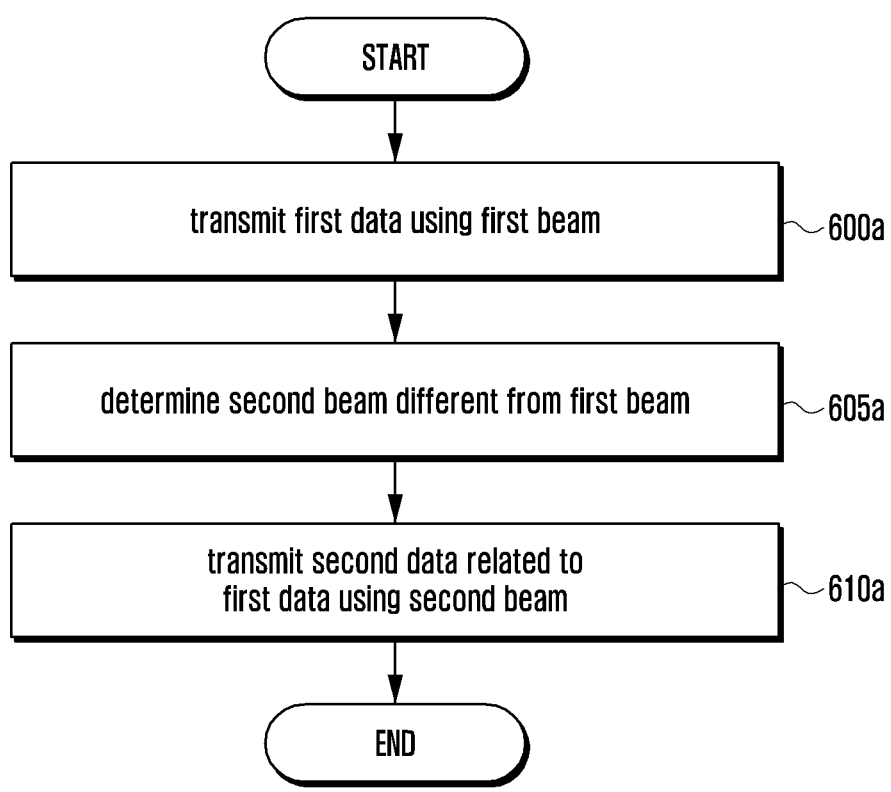
FIG. 6A is a flowchart illustrating data retransmission in a communication system supporting beamforming according to an embodiment of the present disclosure.

FIG. 6A is a flowchart illustrating data retransmission within the retransmission request interval at the MAC layer in a communication system supporting beamforming according to an embodiment of the present disclosure. The operations shown in FIG. 6A may be performed at the data transmitting end (e.g., base station or terminal). The retransmission request interval at the MAC layer may be the HARQ-based retransmission request interval described before or the RACH retransmission request interval to be described later.

At step 600a, the transmitting end may transmit first data using a first beam.

At step 605a, the transmitting end may determine to use a second beam different from the first beam. For example, if a link disconnection is detected during the retransmission request interval at the MAC layer, the transmitting end may use the second beam. The second beam may be selected based on the optimal candidate beam information and the inter-beam transition probability matrix.

At step 610a, the transmitting end may transmit second data related to the first data using the second beam. For example, the second data may be a retransmission of the first data.

Figure 6B:
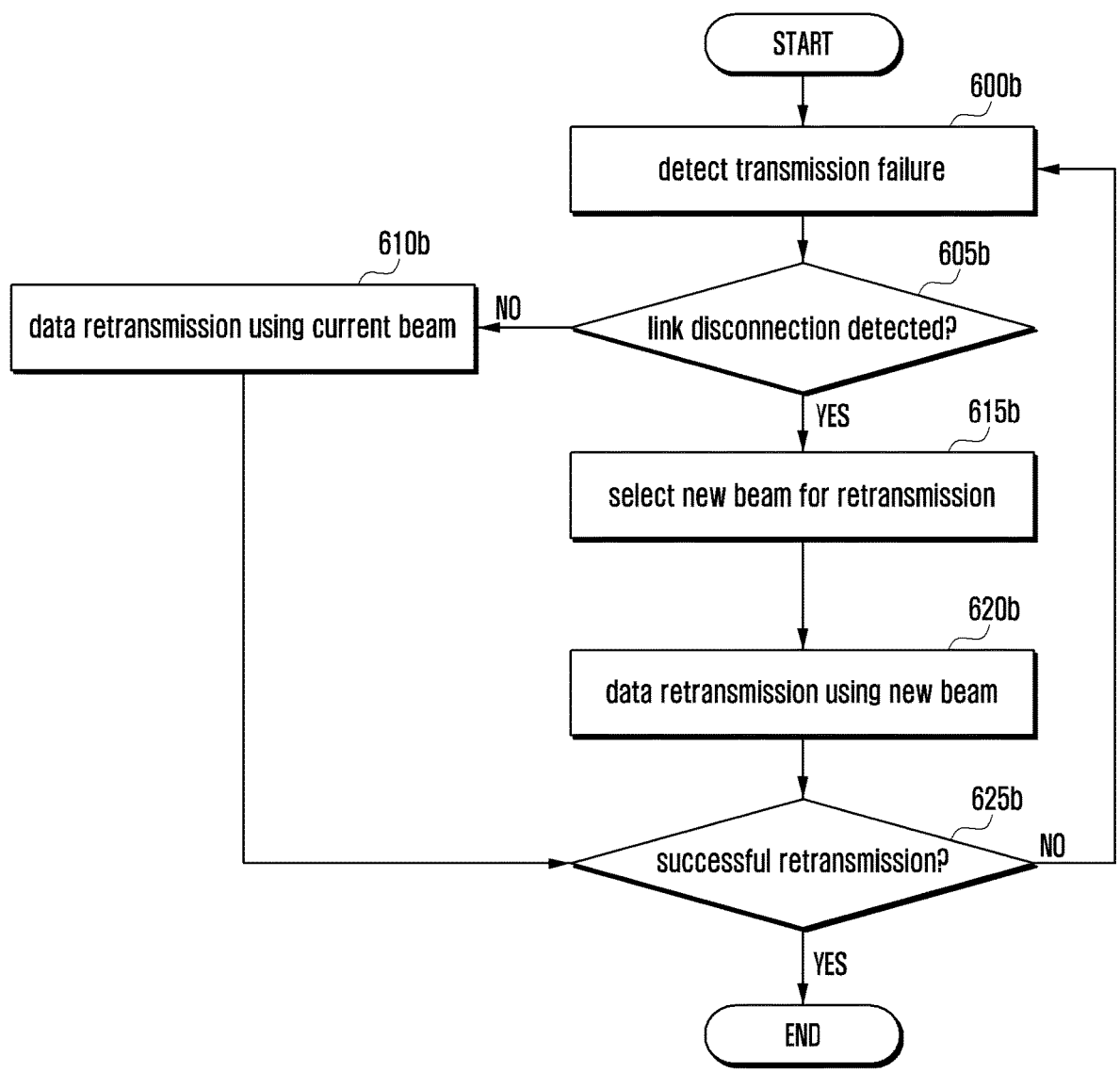
FIG. 6B is a flowchart illustrating HARQ-based data retransmission in a communication system supporting beamforming according to an embodiment of the present disclosure.

FIG. 6B is a flowchart illustrating HARQ-based data retransmission in a communication system supporting beamforming according to an embodiment of the present disclosure. The operations shown in FIG. 6B may be performed at the data transmitting end (e.g., base station or terminal).

At step 600b, the transmitting end may detect a transmission failure. For example, if NACK is received more than a given number of times or ACK/NACK is not received more than a given number of times, the transmitting end may determine that a transmission failure has occurred.

At step 605b, the transmitting end may detect a link disconnection. Link disconnection detection may be performed simultaneously with transmission failure detection.

If no link disconnection is detected, at step 610b, the transmitting end may perform data retransmission using the currently determined beam.

On the other hand, if a link disconnection is detected, at step 615b, the transmitting end may determine a new beam for retransmission. The new beam may be determined on the basis of the optimal candidate beam information and the inter-beam transition probability matrix.

At step 620b, the transmitting end may perform data retransmission using the newly determined beam. At step 625b, the transmitting end may check whether the data retransmission is successful. If the data retransmission is unsuccessful (e.g., an ACK corresponding to the data retransmission is not received), the procedure returns to step 600*b* at which the transmitting end may repeat data retransmission.

Figure 7B:
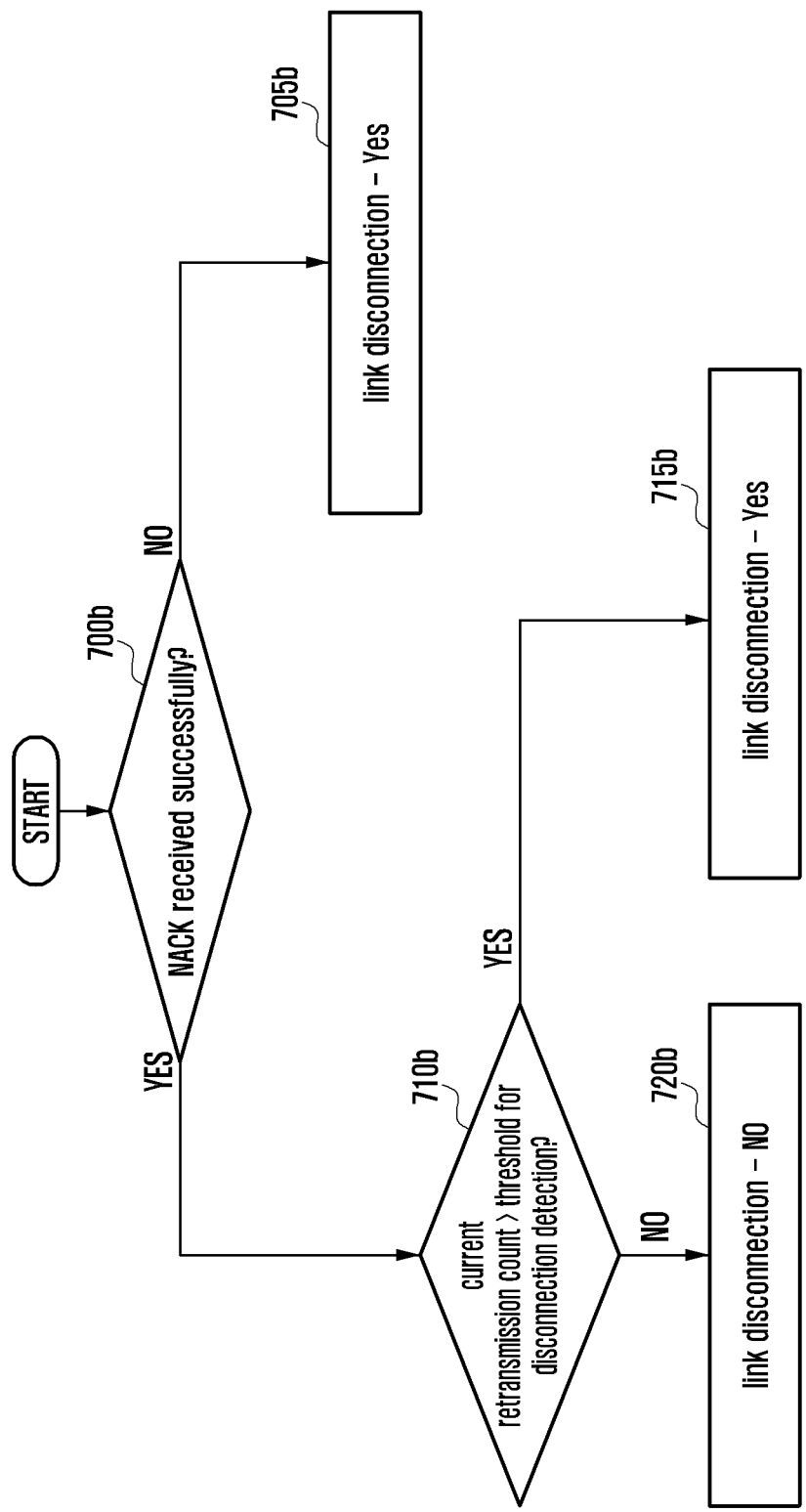

FIGS. 7A and 7B illustrate a flowchart for detecting a link breakage or disconnection that may correspond to step 605*b* of FIG. 6B.

When an ACK is not received for transmitted data, the transmitting end may be aware that the data has not been successfully sent. Since the fact that the data is not successfully sent does not directly imply an occurrence of link disconnection, to newly determine a beam for data retransmission it may be necessary to determine whether the link formed by the currently determined beam has been disconnected.

With reference to FIG. 7A, at step 700*a*, the transmitting end may determine whether a NACK is successfully received. For example, if the NACK is not received more than a given number of times, the transmitting end can determine that the NACK is not successfully received. Upon determining that the NACK is not successfully received, at step 705*a*, the transmitting end may determine that the link is broken or disconnected. Here, the given number of times may be set differently according to whether the HARQ mode is the CC mode or IR mode.

Upon determining that the NACK is successfully received, at step 710*a*, the transmitting end may determine whether RV (Redundancy Version) retransmission has failed. For example, if retransmission fails for all RVs, the transmitting end may determine that RV retransmission is unsuccessful. For another example, when the HARQ mode is the IR mode, the transmitting end can check RV retransmission failure to detect an occurrence of link disconnection.

Upon RV retransmission failure, at step 715*a*, the transmitting end may determine that the link is broken or disconnected. Otherwise, at step 720*a*, the transmitting end may determine that the link is not broken or disconnected.

With reference to FIG. 7B, at step 700*b*, the transmitting end may determine whether the NACK is successfully received. For example, if the NACK is not received more than a given number of times, the transmitting end can determine that the NACK is not successfully received. Upon determining that the NACK is not successfully received, at step 705*b*, the transmitting end may determine that the link is broken or disconnected. Here, the given number of times may be set differently according to whether the HARQ mode is the CC mode or IR mode.

Upon determining that the NACK is successfully received, at step 710*b*, the transmitting end may compare the current retransmission count with a threshold transmission count. If the current retransmission count is greater than the threshold transmission count, at step 715*b*, the transmitting end may determine that the link is broken or disconnected. Otherwise, at step 720*b*, the transmitting end may determine that the link is not broken or disconnected. Here, the threshold transmission count may be set differently according to whether the HARQ mode is the CC mode or IR mode.

Figure 8A:
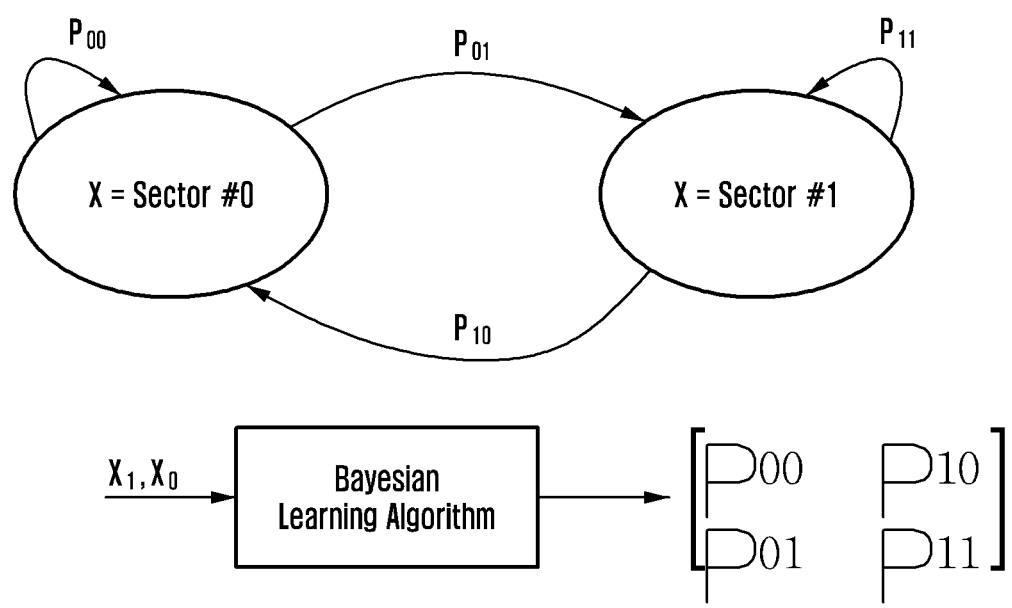
FIG. 8A illustrates beam determination based on the transition probability matrix (TPM) between beams according to an embodiment of the present disclosure.

FIG. 8A illustrates new beam determination based on the inter-beam TPM at step 615*b* of FIG. 6B.

The inter-beam TPM may be learned using a Bayesian learning algorithm. For example, with respect to the transition probability between beam 0 (x0) and beam 1 (x1), the probability of transition from x0 to x0 may be denoted by $P_{00}$; the probability of transition from x0 to x1 may be denoted by $P_{01}$; the probability of transition from x1 to x0 may be denoted by $P_{10}$; and the probability of transition from x1 to x1 may be denoted by $P_{11}$.

FIG. 8B illustrates an inter-beam TPM table according to an embodiment of the present disclosure.

When the transmitting end can use first to fifth beams, the TPM information between the first to fifth beams may be the same as the table shown in FIG. 8B. For example, if a link disconnection is detected during data transmission using the first beam, the transmitting end may predict that retransmission using the second beam can increase the retransmission success rate. Hence, the transmitting end may determine to use the second beam with the highest probability and perform data retransmission using the second beam.

To increase the prediction accuracy, the inter-beam TPM information may be based on a combination of various information such as previous beam training results, inter-beam correlation information, and prior probabilities.

The inter-beam TPM information is obtained through a learning process based on results of beam training in various environments. In addition, the inter-beam TPM information may also be learned according to whether a beam-transition prediction based thereon is successful.

As an example of learning the inter-beam TPM information, the probability can be updated by counting the beam transition prediction success/failure on the basis of the Markovian system.

Equation (1) below shows an example of updating the beam transition probability according to the beam transition prediction success/failure.

$$P_{ij} = \frac{C_{ij}}{\sum_{k \neq i}^{N} C_{ik}} \text{ for } \forall N \qquad \text{Equation (1)}$$

Success transition: $C_{ij} = C_{ij} + 1$
Failed transition: $C_{ij} = C_{ij} - 1$ Here, $P_{ij}$ denotes the probability of transition from beam i to beam j, $C_{ij}$ denotes the total count of transitions from beam i to beam j within a preset window size, and N is the total number of beams. According to Equation (1), when a transition from beam i to beam j is successful, $C_{ij}$ is increased by 1, so that $P_{ij}$ is increased. When a transition from beam i to beam j fails, $C_{ij}$ is decreased by 1, so that $P_{ij}$ is decreased.

In this case, for determining the beam for data retransmission based on the beam transition probability described above, the list of candidate beams for retransmission may be created as follows.

1) Create the first candidate list using the beam with the highest transition probability ($P_{ij}$)
2) Compute the Chapman-Kolmogorov equation $P^2$ to create the second candidate list using the beam with the highest transition probability in two steps As an example of utilizing the candidate lists, the beam with the highest transition probability in the first candidate list may be used as the first beam for retransmission, and when retransmission fails, the beam with the second highest transition probability may be used as the second beam for retransmission. As another example, the beam with the highest transition probability in two steps in the second candidate list may be used as the second beam for retransmission.

The inter-beam TPM information may also be learned through Bayesian estimation based on results of periodic/aperiodic beam training.

In periodic beam training, when the base station periodically transmits a BRS, the terminal may measure the BRS to acquire optimal beam information.

In aperiodic beam training, when the base station transmits a beam refinement reference signal (BRRS) by scheduling, the terminal may measure the BRRS to acquire optimal beam information.

Figure 9:
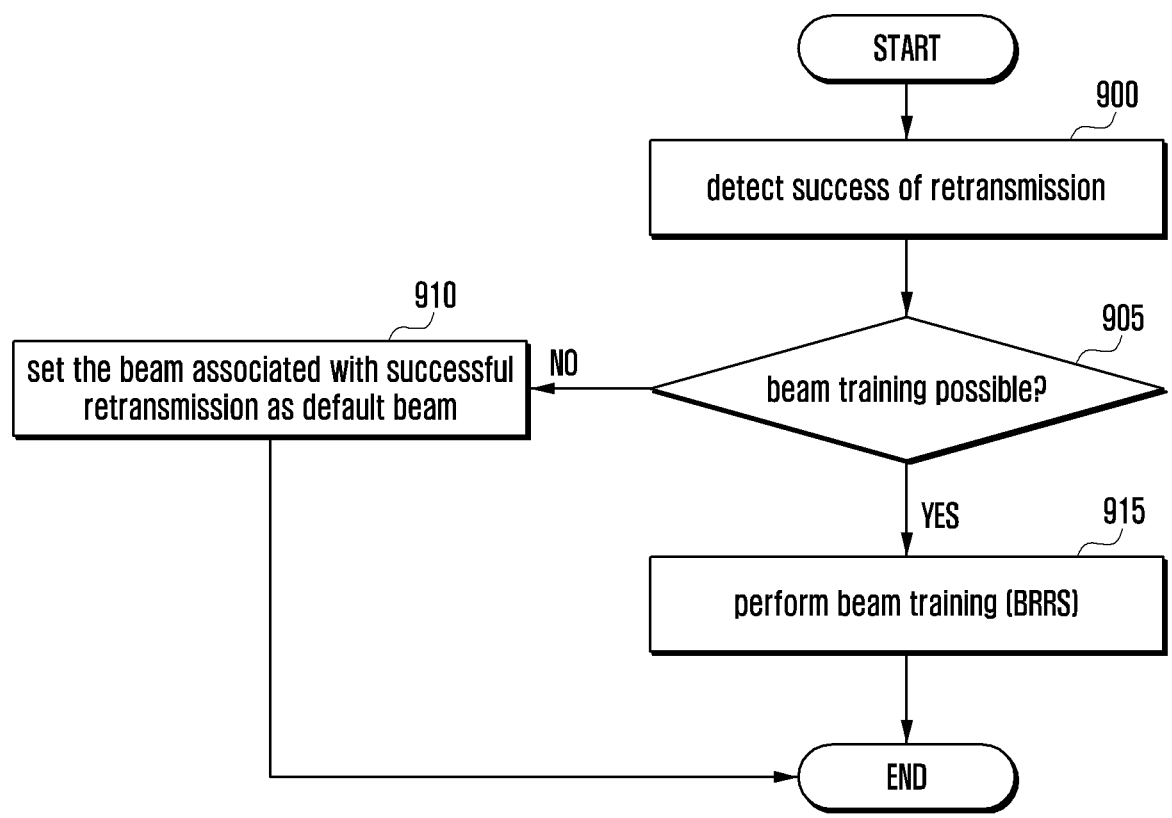
FIG. 9 is a flowchart illustrating aperiodic beam training according to an embodiment of the present disclosure.

FIG. 9 is a flowchart illustrating aperiodic beam training.

As described above, the transmitting end (e.g., base station) can perform data retransmission by using a newly determined beam. At step 900, the transmitting end may detect success of data retransmission. Although the retransmission using the newly determined beam is successful, the newly determined beam may not be the optimal beam. At step 905, the transmitting end may check the possibility of beam training. For example, when the transmitting end is the base station, the base station may receive a beam training request from the terminal. When the transmitting end is the terminal, the terminal may receive a beam training request from the base station or send a beam training request to the base station.

If beam training is not possible, at step 910, the transmitting end may set the beam associated with successful retransmission as a default beam. That is, at a later time, the beam set as a default beam may be used to transmit data, preventing additional failure. If beam training is possible, at step 915, the transmitting end may initiate aperiodic beam training using a BRRS. The optimal beam may be obtained as a result of beam training. For example, the optimal beam obtained as a result of beam training may be identical to the existing beam associated with successful retransmission.

Figure 10:
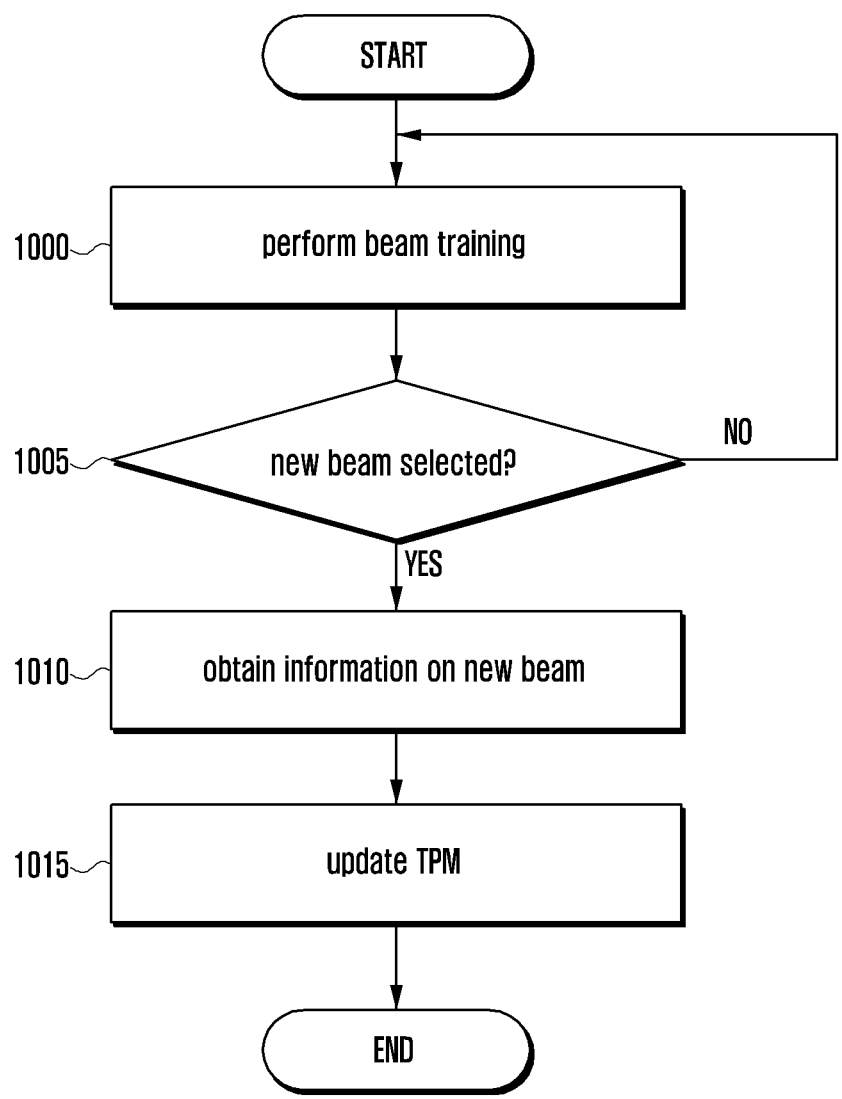
FIG. 10 is a flowchart illustrating updating the TPM between beams based on beam training according to an embodiment of the present disclosure.

FIG. 10 is a flowchart illustrating updating the TPM between beams based on periodic and/or aperiodic beam training according to an embodiment of the present disclosure.

At step 1000, the transmitting end may initiate periodic and/or aperiodic beam training. At step 1005, the transmitting end may determine whether a new beam has been determined as the optimal beam as a result of beam training. If a new beam has been determined as the optimal beam, at step 1010, the transmitting end may obtain information on the newly determined beam. At step 1015, the transmitting end may update the inter-beam TPM information on the basis of the obtained information on the new beam.

For example, updating the TPM information at step 1015 may include updating the prior probability of the TPM, obtaining a new likelihood value based on the information on the optimal beam identified as a result of beam training, computing the marginal probability accordingly, and computing the posterior probability of the TPM.

In an embodiment of the present disclosure, the transmitting end can determine a new beam for data retransmission using the inter-beam TPM information.

If the transmitting end is the base station, the base station can apply the inter-beam TPM information, obtained as a result of beam training with multiple terminals in its coverage, to a particular terminal. For example, the inter-beam TPM information managed by the base station can be learned as a result of beam training with multiple terminals, and the learned inter-beam TPM information can be applied to not only one of the multiple terminals but also a new terminal for data retransmission.

Figure 11:
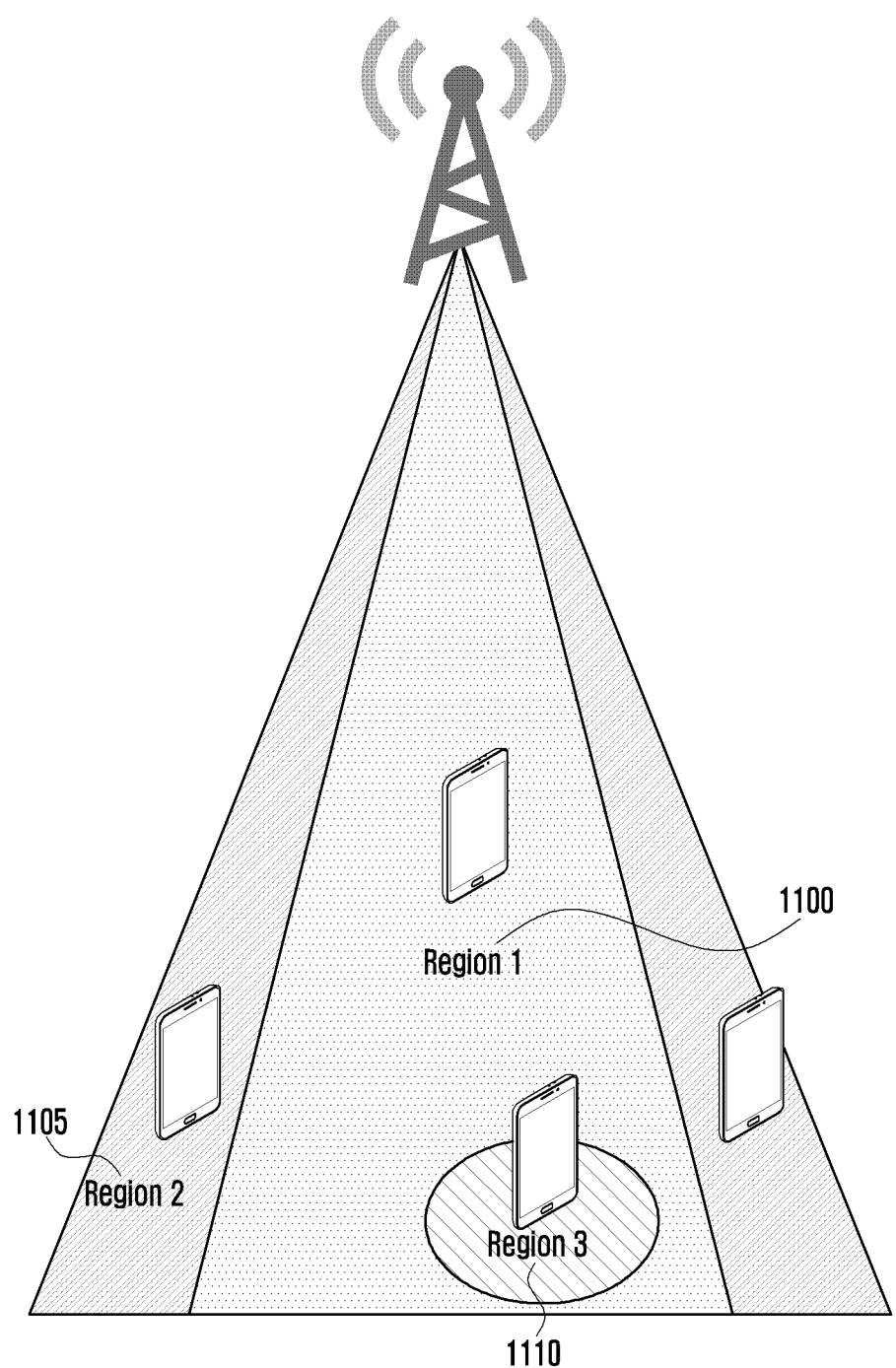
FIG. 11 illustrates TPM management by region in the base station according to an embodiment of the present disclosure.

When the transmitting end is the base station, the base station may manage separate pieces of inter-beam TPM information for different regions. The coverage area of the base station or cell may be so large that it is difficult to cover the entire area with a single piece of inter-beam TPM information. In this case, as shown in FIG. 11, the base station may manage one piece of inter-beam TPM information for each of the regions 1100, 1105 and 1110. The base station may use GPS location information of terminals or positioning technologies to divide the coverage area into several regions with similar beam transition probabilities, and may manage and use separate pieces of inter-beam TPM information for the different regions.

On the other hand, when the transmitting end is the terminal, unlike the base station, the beam transition probability of the terminal may be greatly influenced by mobility of the terminal. Hence, the terminal may utilize its inter-beam TPM information in consideration of the mobility thereof.

Figure 12:
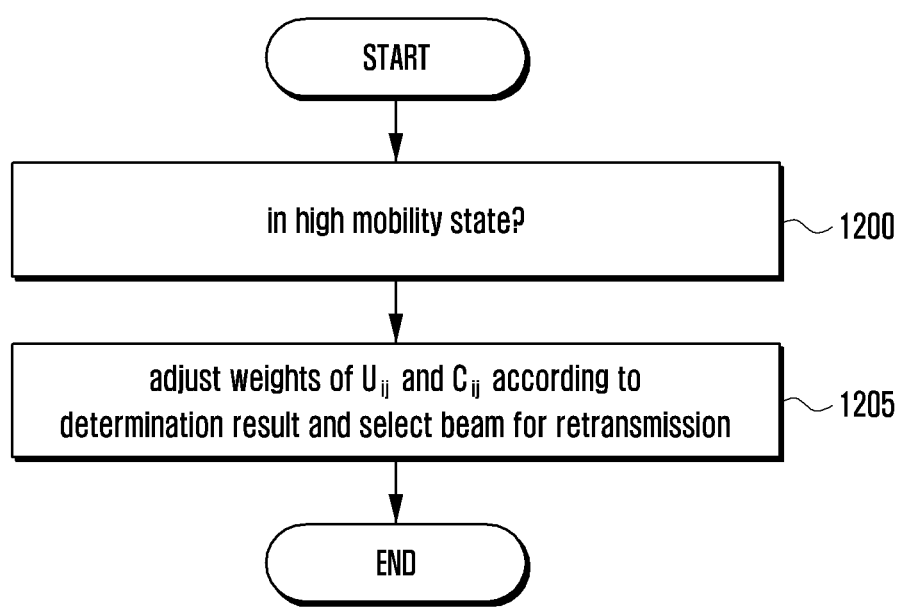
FIG. 12 is a flowchart illustrating the retransmission beam determination based on the TPM and mobility of the terminal according to an embodiment of the present disclosure.

FIG. 12 is a flowchart illustrating retransmission beam determination based on the TPM and mobility of the terminal according to an embodiment of the present disclosure.

At step 1200, the terminal may determine whether it is in a high mobility state. For example, the terminal may be determined to be in a high mobility state when the frequency at which the optimum beam pair is greater than or equal to a preset threshold, or when the frequency of handover or cell re-selection is greater than or equal to a preset threshold.

At step 1205, the terminal may calculate the inter-beam transition probability using Equation (2) according to whether the terminal is in a high mobility state.

$$P_{ij} = \frac{\alpha U_{ij} + \beta C_{ij}}{\sum_{k \neq i}^{N} (\alpha U_{ik} + \beta C_{ik}) \text{ for } \forall N} \qquad \text{Equation (2)}$$

Here, $P_{ij}$ denotes the probability of transition from beam i to beam j, $C_{ij}$ denotes the total count of transitions from beam i to beam j within a preset window size, $U_{ij}$ means the uncorrelated factor between beam i and beam j, and N is the total number of beams. If it is determined to be in a high mobility state, to improve the real-time adaptability, the weight $\alpha$ of $U_{ij}$ may be increased and the weight $\beta$ of $C_{ij}$ may be decreased. If it is determined not to be in a high mobility state, to improve the learning-based adaptability, the weight $\alpha$ of $U_{ij}$ may be decreased and the weight $\beta$ of $C_{ij}$ may be increased.

The terminal may calculate the beam transition probability based on the adjusted $\alpha$ and $\beta$ values according to the mobility thereof and determine the beam with the highest transition probability as the beam for data retransmission.

Figure 13:
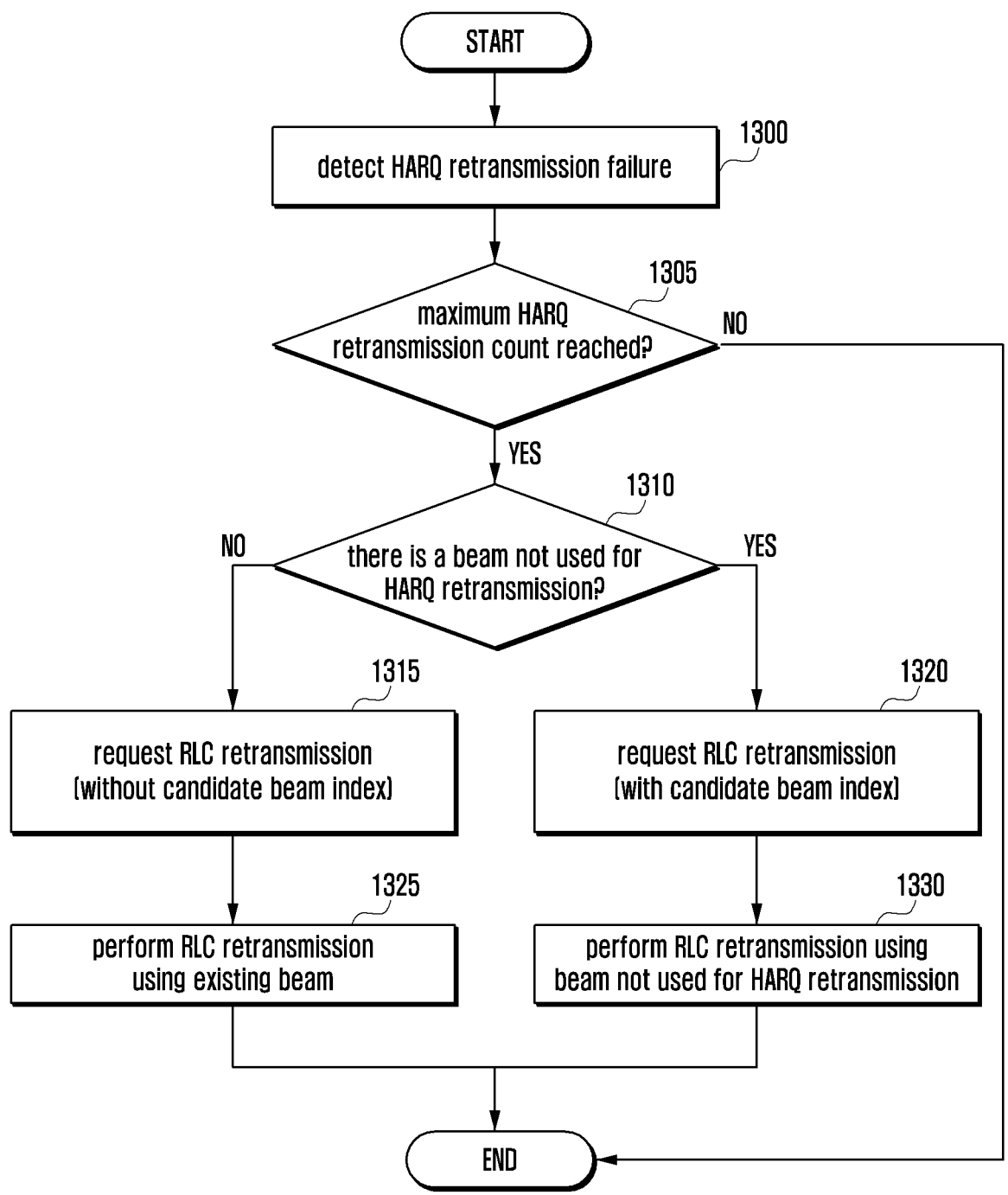
FIG. 13 is a flowchart illustrating cooperation between HARQ retransmission and RLC retransmission according to an embodiment of the present disclosure.

FIG. 13 is a flowchart illustrating cooperation between HARQ retransmission and RLC retransmission according to an embodiment of the present disclosure.

In an embodiment of the present disclosure, when the maximum number of HARQ retransmissions is smaller than the number of available candidate beams, cooperation between HARQ retransmission and RLC retransmission may be initiated if HARQ retransmission fails. If a beam is not used for HARQ retransmission, it may be used for RLC retransmission.

At step 1300, the transmitting end may detect HARQ retransmission failure. HARQ retransmission failure corresponds to a case where an ACK/NACK is not received more than a given number of times or a NACK is received more than a given number of times. Such determination may be made on the basis of the HARQ mode.

At step 1305, the transmitting end may determine whether the number of data retransmissions has reached the maximum HARQ retransmission count. Upon determining that the number of data retransmissions has reached the maximum HARQ retransmission count, at step 1310, the transmitting end may determine whether there is a beam not used for HARQ retransmission.

Upon determining that every beam is used for HARQ retransmission, at step 1315, the transmitting end may request RLC retransmission without a candidate beam index. At step 1325, the transmitting end may perform RLC retransmission using the existing beams.

Upon determining that there is a beam not used for HARQ retransmission, at step 1320, the transmitting end may request RLC retransmission along with an index to a candidate beam not used for HARQ retransmission. At step 1330, the transmitting end may perform RLC retransmission using a beam not used for HARQ retransmission according to the candidate beam index.

According to an embodiment of the present disclosure, it is possible to perform retransmission using all the available beams on the basis of the beam transition probability and cooperation between HARQ retransmission and RLC retransmission.

FIGS. 14 to 17 are sequence diagrams illustrating a scheme for retransmission beam determination in data retransmission according to embodiments of the present disclosure. To notify the base station of the result of beam training, the terminal may send the base station information on the base station transmission beams only or information on the pairs of base station transmission beams and terminal reception beams. In addition, the terminal may send the base station the optimal beam information only, or both the optimal beam information and the candidate beam information. FIGS. 14 to 17 illustrate various schemes for retransmission beam determination according to the information on the beam training result. In FIGS. 14 to 17, the base station operates as a data transmitting end and performs data retransmission. However, those skilled in the art can readily understand that the present disclosure can also be applicable to the case where the terminal operates as a data transmitting end.

Figure 14:
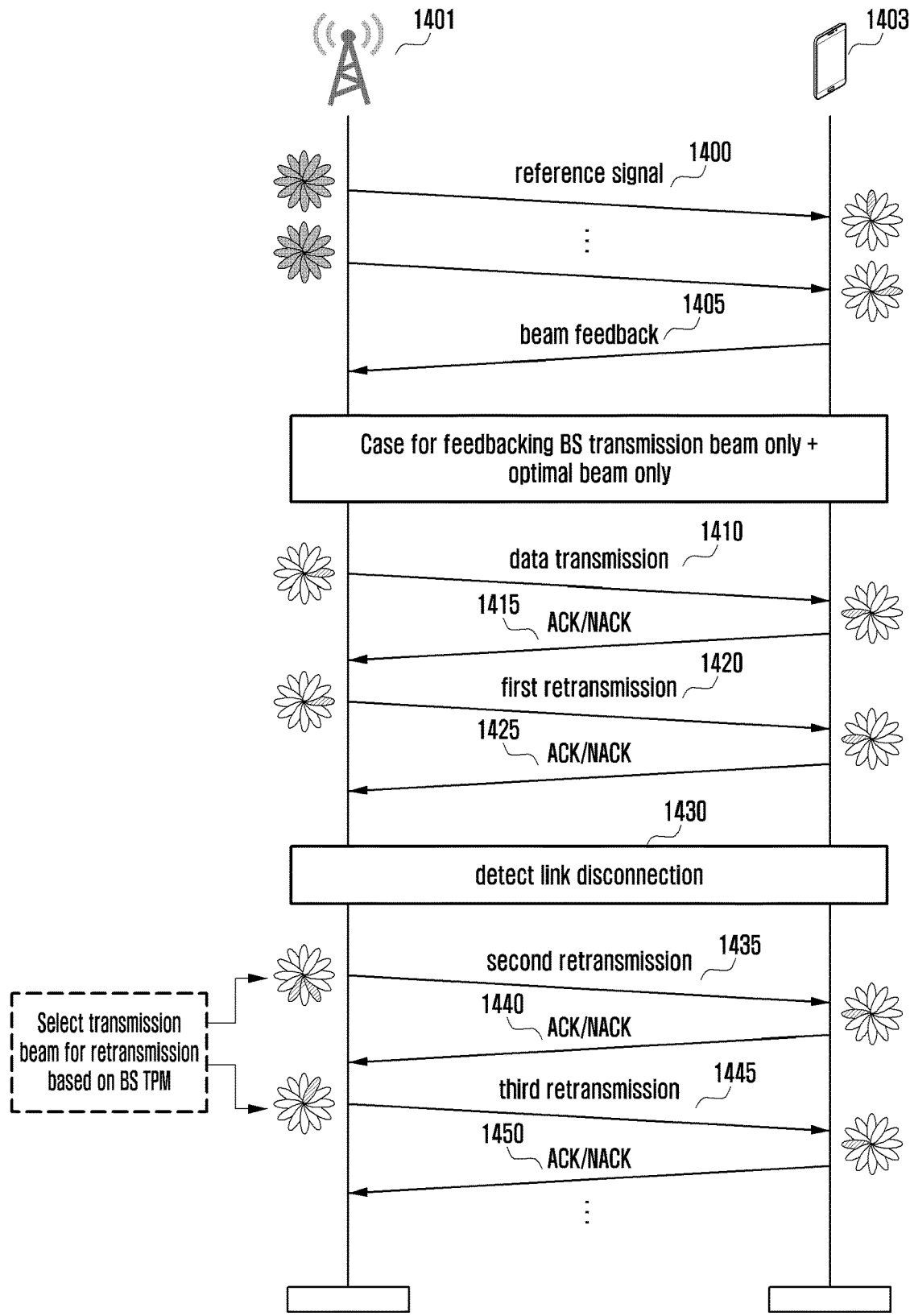
FIG. 14 is a sequence diagram illustrating a scheme for retransmission beam determination in data retransmission according to an embodiment of the present disclosure.

FIG. 14 describes a case where the terminal sends the base station the optimal beam information only after beam training.

At step 1400, the base station 1401 may transmit a reference signal (e.g., BRS or BRRS) to the terminal 1403. The terminal 1403 may obtain information on the optimal beam pair through full beam sweeping. In an embodiment of the present disclosure, at step 1405, the terminal 1403 may send the base station 1401 only optimal base station transmission beam information among the obtained beam pair information.

At step 1410, the base station 1401 may transmit the terminal 1403 data using the optimal transmission beam. The terminal 1403 may monitor data reception using the optimal reception beam. At step 1415, the terminal 1403 may transmit an ACK or NACK according to reception of the data.

If the terminal 1403 fails to receive the data (e.g., the base station receives a NACK, or does not receive either the ACK or NACK), at step 1420, the base station 1401 may send first retransmission data using the optimal transmission beam. The terminal 1403 may monitor data reception using the optimal reception beam. At step 1425, the terminal 1403 may transmit the ACK or NACK according to reception of the first retransmission data.

Meanwhile, at step 1430, the base station 1401 may detect a link disconnection. Examples for determining link disconnection have been described above with reference to FIGS. 7A and 7B. For example, upon detecting a link disconnection, the base station 1401 may determine a transmission beam for retransmission based on the stored inter-beam TPM information. The base station 1401 may determine a transmission beam for retransmission at random. Alternatively, the base station 1401 may determine a transmission beam on the basis of at least one measurement report received from the terminal 1403 or another terminal.

At step 1435, the base station 1401 may send second retransmission data using the newly determined transmission beam. It will be understood by those skilled in the art that the second retransmission data may refer to any retransmission data sent after the transmission beam for retransmission has been determined.

The terminal 1403 may monitor data reception using the optimal reception beam. At step 1440, the terminal 1403 may transmit an ACK or NACK according to reception of the second retransmission data. If the terminal 1403 fails to receive the second retransmission data (e.g., the base station receives a NACK, or does not receive either the ACK or NACK), the base station 1401 may determine a new transmission beam for retransmission based on the inter-beam TPM information. The base station 1401 may determine a new transmission beam for retransmission at random. Alternatively, the base station 1401 may determine a new transmission beam on the basis of at least one measurement report received from the terminal 1403 or another terminal. In addition, the base station 1401 may update the inter-beam TPM information according to failure of the second retransmission attempt.

At step 1445, the base station 1401 may send third retransmission data using the newly determined transmission beam. The terminal 1403 may monitor data reception using the optimal reception beam. At step 1450, the terminal 1403 may transmit the ACK or NACK according to reception of the third retransmission data.

In an embodiment of the present disclosure, such data retransmission operation can be repeated until the base station 1401 succeeds in sending the data or until the number of retransmissions reaches the maximum number of retransmissions.

Figure 15:
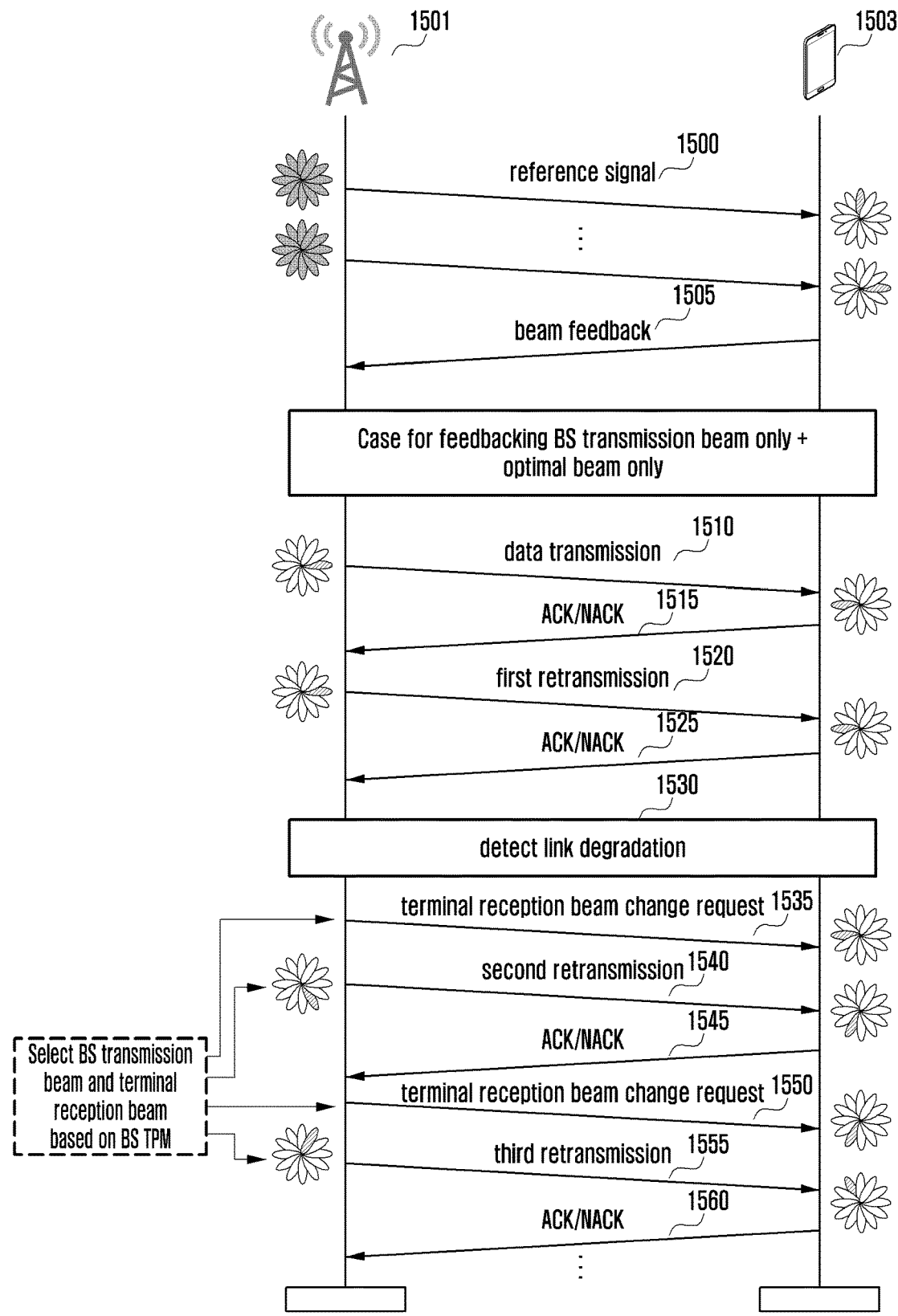
FIG. 15 is a sequence diagram illustrating a scheme for retransmission beam determination in data retransmission according to an embodiment of the present disclosure.

FIG. 15 describes a case where the terminal sends the base station information on the optimal pair of base stations and terminal beams after beam training.

At step 1500, the base station 1501 may transmit a reference signal (e.g., BRS or BRRS) to the terminal 1503. The terminal 1503 may obtain information on the optimal beam pair through full beam sweeping. In an embodiment of the present disclosure, at step 1505, the terminal 1503 may send the base station 1501 the obtained optimal beam pair information.

At step 1510, the base station 1501 may transmit the terminal 1503 data using the optimal transmission beam. The terminal 1503 may monitor data reception using the optimal reception beam. At step 1515, the terminal 1503 may transmit an ACK or NACK according to reception of the data.

If the terminal 1503 fails to receive the data (e.g., the base station receives a NACK, or does not receive either the ACK or NACK), at step 1520, the base station 1501 may send first retransmission data using the optimal transmission beam. The terminal 1503 may monitor data reception using the optimal reception beam. At step 1525, the terminal 1503 may transmit the ACK or NACK according to reception of the first retransmission data.

Meanwhile, at step 1530, the base station 1501 may detect a link disconnection. Examples for determining link disconnection have been described before with reference to FIGS. 7A and 7B. For example, upon detecting a link disconnection, the base station 1501 may determine a beam pair for retransmission based on the stored inter-beam TPM information. The base station 1501 may determine a beam pair for retransmission at random. Alternatively, the base station 1501 may determine a beam pair on the basis of at least one measurement report received from the terminal 1503 or another terminal.

At step 1535, the base station 1501 may transmit a reception beam change request including the changed reception beam information to the terminal 1503. At step 1540, the base station 1501 may send second retransmission data using the newly determined transmission beam for retransmission. It will be understood by those skilled in the art that the second retransmission data may refer to any retransmission data sent after the transmission beam for retransmission has been determined.

The terminal 1503 may monitor data reception using the changed reception beam. At step 1545, the terminal 1503 may transmit an ACK or NACK according to reception of the second retransmission data. If the terminal 1503 fails to receive the second retransmission data (e.g., the base station receives a NACK or does not receive either the ACK or NACK), the base station 1501 may determine a new beam pair for retransmission based on the inter-beam TPM information. The base station 1501 may determine a new beam pair for retransmission at random. Alternatively, the base station 1501 may determine a new beam pair on the basis of at least one measurement report received from the terminal 1503 or another terminal. In addition, the base station 1501 may update the inter-beam TPM information according to failure of the second retransmission attempt.

At step 1550, the base station 1501 may transmit a reception beam change request including the changed reception beam information to the terminal 1503. At step 1555, the base station 1501 may send third retransmission data using the newly determined transmission beam. The terminal 1503 may monitor data reception using the changed reception beam. At step 1560, the terminal 1503 may transmit the ACK or NACK according to reception of the third retransmission data.

In an embodiment of the present disclosure, such data retransmission operation can be repeated until the base station 1501 succeeds in sending the data, or until the number of retransmissions reaches the maximum number of retransmissions.

Figure 16:
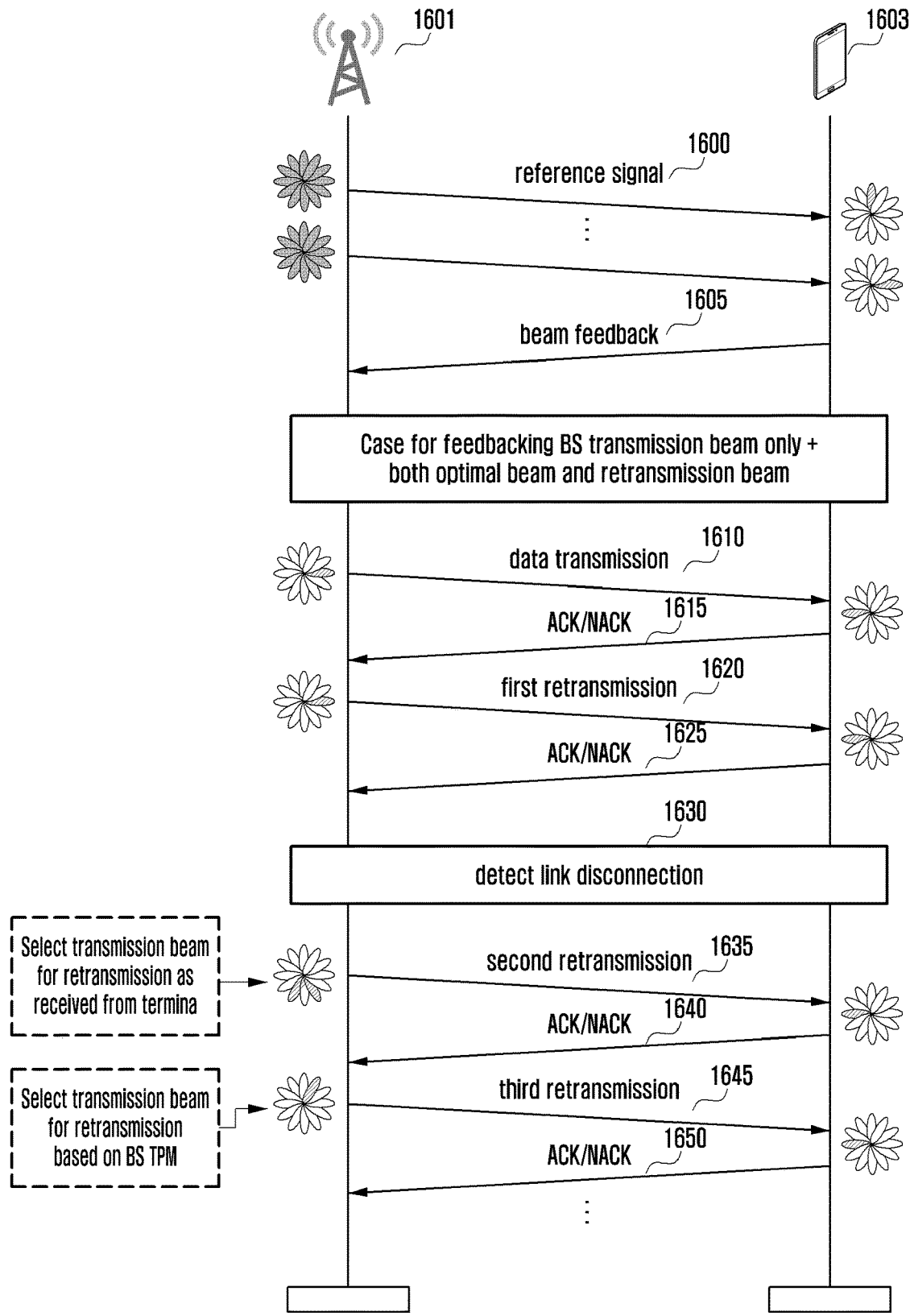
FIG. 16 is a sequence diagram illustrating a scheme for retransmission beam determination in data retransmission according to an embodiment of the present disclosure.

FIG. 16 describes a case where the terminal sends the base station information on the optimal beam and candidate beam after beam training.

At step 1600, the base station 1601 may transmit a reference signal (e.g., BRS or BRRS) to the terminal 1603. The terminal 1603 may obtain information on the optimal beam pair and the candidate beam pair through full beam sweeping. In an embodiment of the present disclosure, at step 1605, the terminal 1603 may send the base station 1601 information on the optimal base station transmission beam and the base station candidate transmission beam only among the obtained beam pair information.

At step 1610, the base station 1601 may transmit the terminal 1603 data using the optimal transmission beam. The terminal 1603 may monitor data reception using the optimal reception beam. At step 1615, the terminal 1603 may transmit an ACK or NACK according to reception of the data.

If the terminal 1603 fails to receive the data (e.g., the base station receives a NACK, or does not receive either the ACK or NACK), at step 1620, the base station 1601 may send first retransmission data using the optimal transmission beam. The terminal 1603 may monitor data reception using the optimal reception beam. At step 1625, the terminal 1603 may transmit the ACK or NACK according to reception of the first retransmission data.

Meanwhile, at step 1630, the base station 1601 may detect a link disconnection. Examples for determining link disconnection have been described before with reference to FIGS. 7A and 7B. Upon detecting a link disconnection the base station 1601 may determine a new transmission beam for retransmission on the basis of the candidate transmission beam information received from the terminal 1603. At step 1635, the base station 1601 may send second retransmission data using the newly determined transmission beam for retransmission. It will be understood by those skilled in the art that the second retransmission data may refer to any retransmission data sent after the transmission beam for retransmission has been determined.

The terminal 1603 may monitor data reception using the optimal reception beam. At step 1640, the terminal 1603 may transmit an ACK or NACK according to reception of the second retransmission data. If the terminal 1603 fails to receive the second retransmission data (e.g., the base station receives a NACK, or does not receive either the ACK or NACK), the base station 1501 may determine a new transmission beam for retransmission based on the inter-beam TPM information. The base station 1601 may determine a new transmission beam for retransmission at random. Alternatively, the base station 1601 may determine a new transmission beam on the basis of at least one measurement report received from the terminal 1603 or another terminal.

At step 1645, the base station 1601 may send third retransmission data using the newly determined transmission beam. The terminal 1603 may monitor data reception using the optimal reception beam. At step 1650, the terminal 1603 may transmit the ACK or NACK according to reception of the third retransmission data.

In an embodiment of the present disclosure, such data retransmission operation can be repeated until the base station 1601 succeeds in sending the data or until the number of retransmissions reaches the maximum number of retransmissions.

Figure 17:
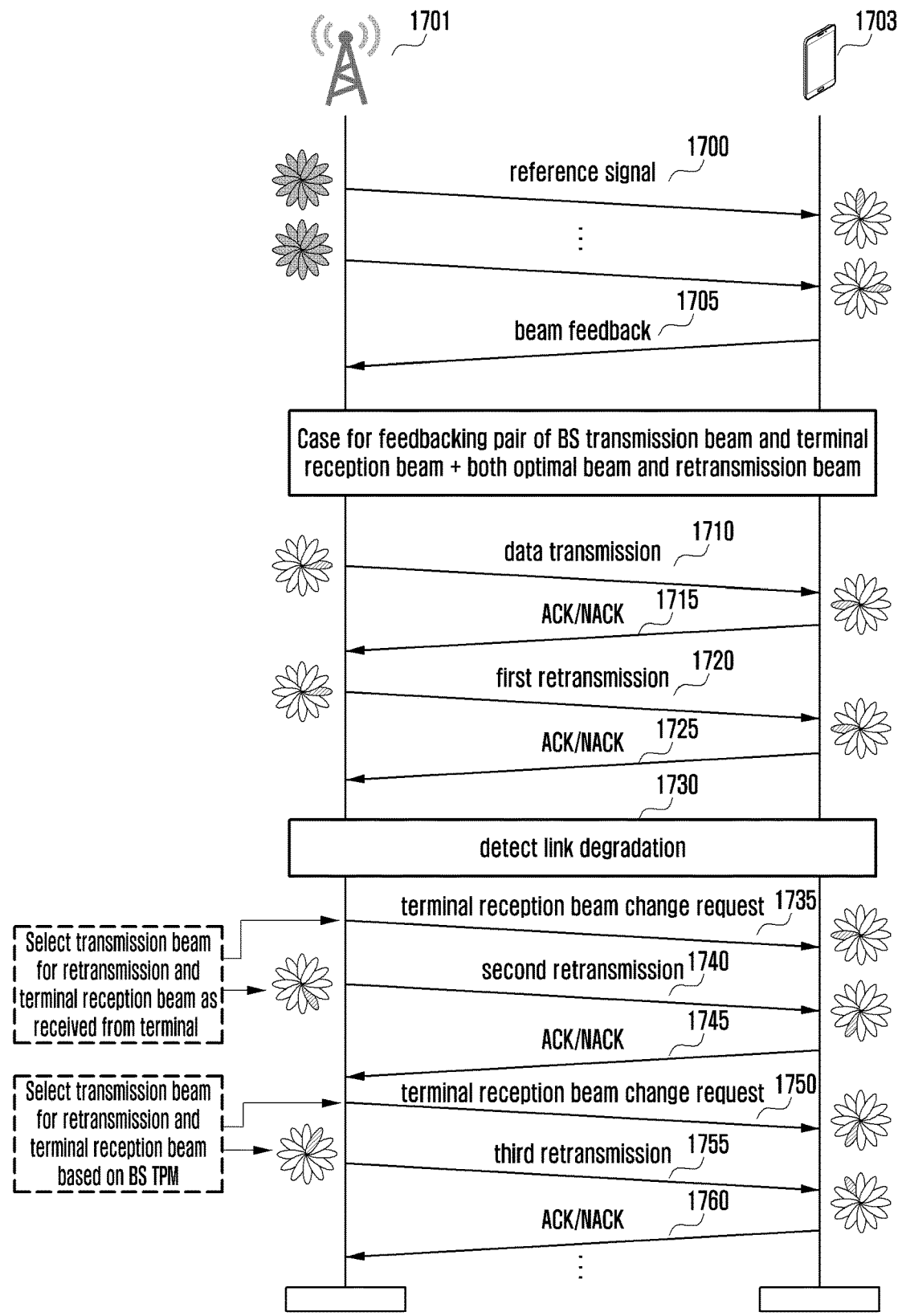
FIG. 17 is a sequence diagram illustrating a scheme for retransmission beam determination in data retransmission according to an embodiment of the present disclosure.

FIG. 17 describes a case where the terminal sends the base station both information on the pair of optimal beams and information on the pair of candidate beams after beam training.

At step 1700, the base station 1701 may transmit a reference signal (e.g., BRS or BRRS) to the terminal 1703. The terminal 1703 may obtain information on the optimal beam pair and information on the candidate beam pair through full beam sweeping. In an embodiment of the present disclosure, at step 1705, the terminal 1703 may send the base station 1701 the obtained optimal beam pair information and candidate beam pair information.

At step 1710, the base station 1701 may transmit the terminal 1703 data using the optimal transmission beam. The terminal 1703 may monitor data reception using the optimal reception beam. At step 1715, the terminal 1703 may transmit an ACK or NACK according to reception of the data.

If the terminal 1703 fails to receive the data (e.g., the base station receives a NACK, or does not receive either the ACK or NACK), at step 1720, the base station 1701 may send first retransmission data using the optimal transmission beam. The terminal 1703 may monitor data reception using the optimal reception beam. At step 1725, the terminal 1703 may transmit the ACK or NACK according to reception of the first retransmission data.

Meanwhile, at step 1730, the base station 1701 may detect a link disconnection. Examples for determining link disconnection have been described before with reference to FIGS. 7A and 7B. For example, upon detecting a link disconnection, the base station 1701 may determine a beam pair for retransmission based on the candidate beam pair information received from the terminal 1703.

At step 1735, the base station 1701 may transmit a reception beam change request including the changed reception beam information to the terminal 1703. At step 1740, the base station 1701 may send second retransmission data using the newly determined transmission beam for retransmission. It will be understood by those skilled in the art that the second retransmission data may refer to any retransmission data sent after the transmission beam for retransmission has been determined.

The terminal 1703 may monitor data reception using the changed reception beam. At step 1745, the terminal 1703 may transmit an ACK or NACK according to reception of the second retransmission data. If the terminal 1703 fails to receive the second retransmission data (e.g., the base station receives a NACK, or does not receive either the ACK or NACK), the base station 1701 may determine a new beam pair for retransmission based on the inter-beam TPM information. The base station 1701 may determine a new beam pair for retransmission at random. Alternatively, the base station 1701 may determine a new beam pair on the basis of at least one measurement report received from the terminal 1703 or another terminal. In addition, the base station 1701 may update the inter-beam TPM information according to a failure of the second retransmission attempt.

At step 1750, the base station 1701 may transmit a reception beam change request including the changed reception beam information to the terminal 1703. At step 1755, the base station 1701 may send third retransmission data using the newly determined transmission beam. The terminal 1703 may monitor data reception using the changed reception beam. At step 1760, the terminal 1703 may transmit the ACK or NACK according to reception of the third retransmission data.

In an embodiment of the present disclosure, such data retransmission operation can be repeated until the base station 1701 succeeds in sending the data or until the number of retransmissions reaches the maximum number of retransmissions.

Meanwhile, in various embodiments of the present disclosure, it is possible to determine a new beam when a link disconnection is detected during RACH retransmission operation.

Figure 18A:
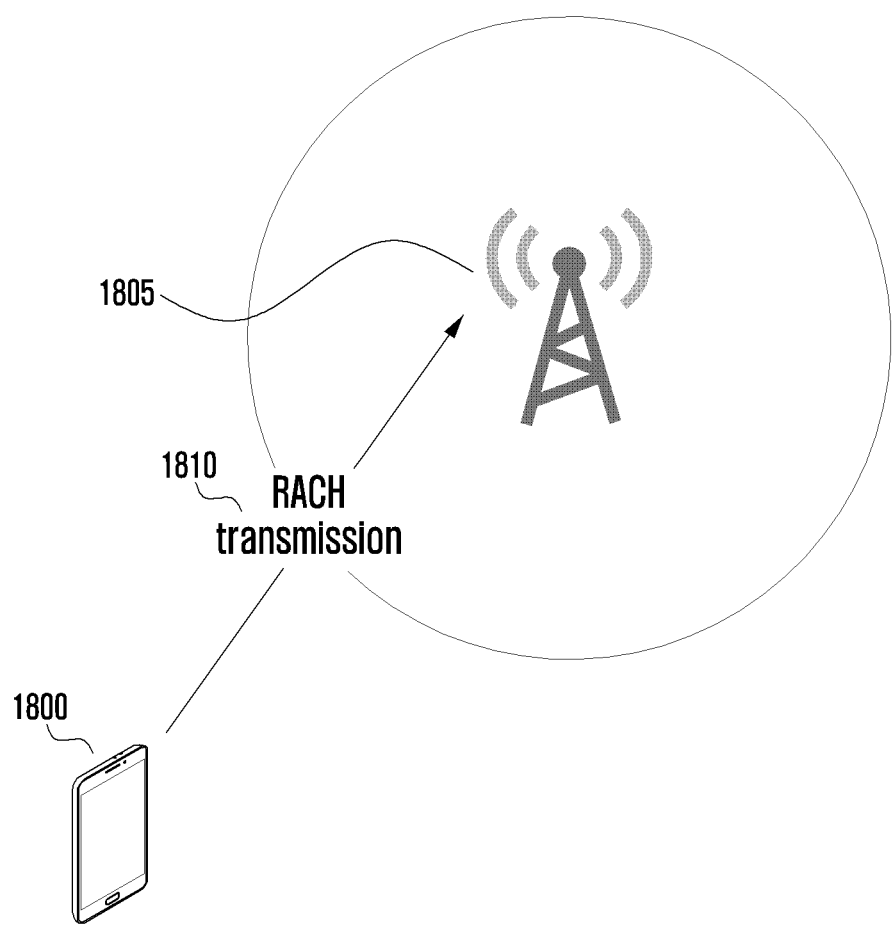
FIGS. 18A and 18B illustrate random access channel (RACH) transmission.
Figure 18B:
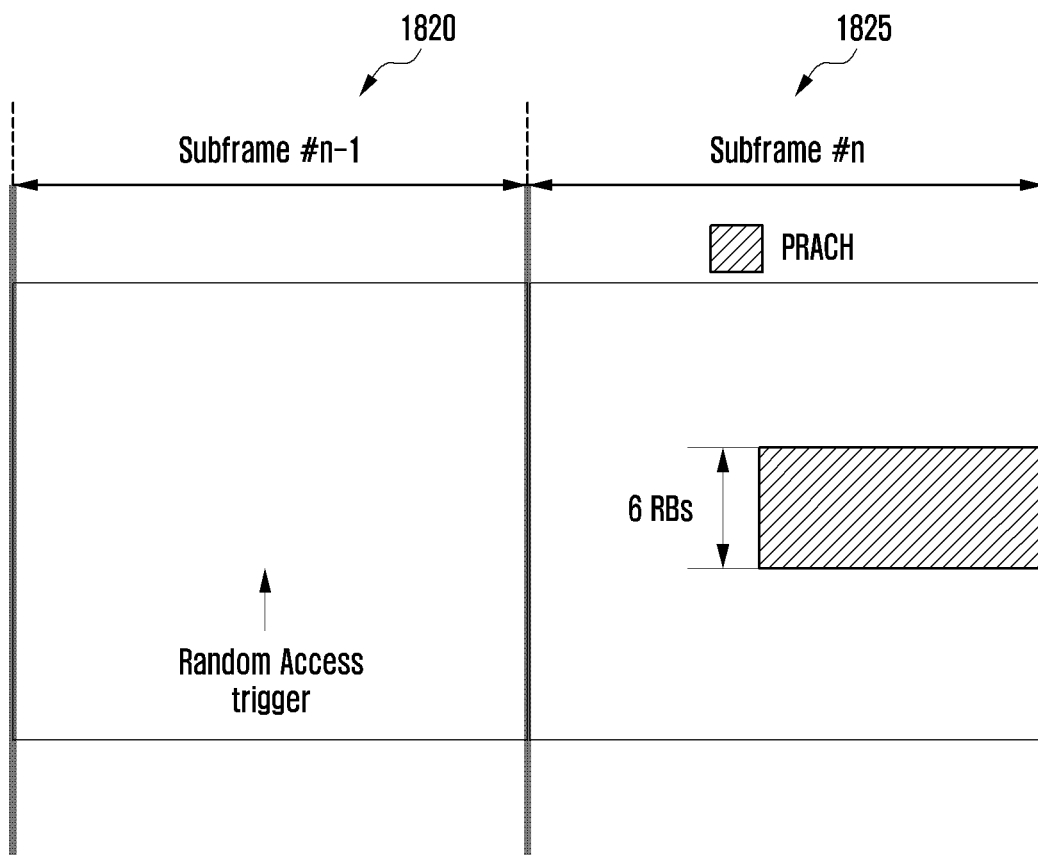

FIGS. 18A and 18B illustrate RACH transmission.

For example, in the LTE-A system, to initially access the system, the terminal 1800 may perform a cell search to establish downlink time and frequency domain synchronization and acquires a cell ID. The terminal 1800 may receive system information from the base station 1805 to obtain basic parameter values related to transmission and reception such as the system bandwidth. The terminal 1800 may then perform a random access procedure to switch the link with the base station 1805 to a connected state. For random access, the terminal 1800 may perform 1810 RACH transmission to the base station 1805). This may be interpreted as being identical to the transmission of a random access preamble.

For example, if random access is triggered at subframe # n−1 1820, the terminal 1800 may transmit a random access preamble through the physical random access channel (PRACH) at subframe #n 1825. Here, subframe #n 1825 may be referred to as a RACH subframe.

Meanwhile, in the 5G system, beam-based random access can be performed. For example, the base station may receive the RACH, which is sent by the terminal using a transmission beam, through reception beam sweeping within the RACH subframe.

In this case, via the system information received from the base station 1805 (e.g., master information block (MIB), system information block (SIB)), the terminal 1800 can obtain information about when the RACH subframe is configured at what period, and in what beam order the base station sweeps the RACH.

Figure 19A:
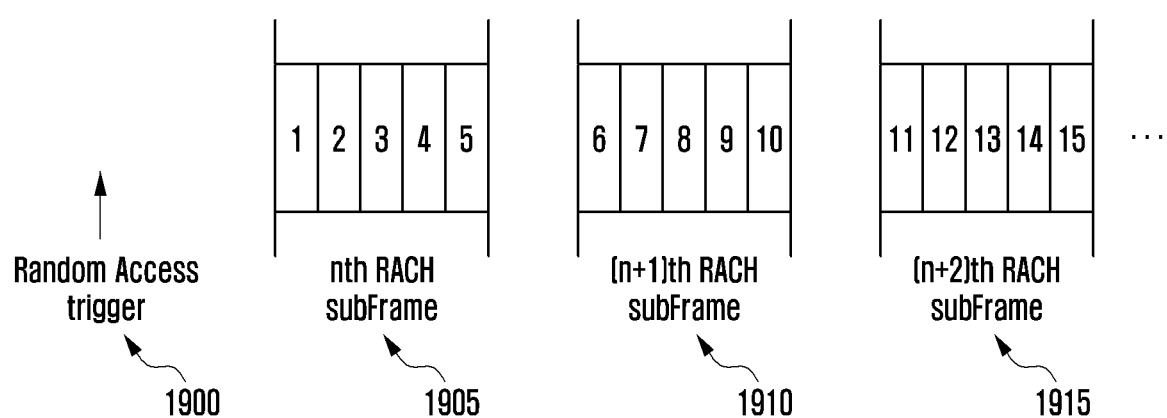
FIG. 19A illustrates RACH transmission in a communication system supporting beamforming.

Based on the obtained information, the terminal 1800 can identify which reception beam is assigned to which RACH resource. For example, in FIG. 19A, after random access trigger 1900, beams #1 to #5 may be assigned to a resource in the $n^{th}$ RACH subframe 1905, beams #6 to #10 may be assigned to a resource in the $n+1^{th}$ RACH subframe 1910, and beams #11 to #15 may be assigned to a resource in the n+2th RACH subframe 1915.

Figure 19B:
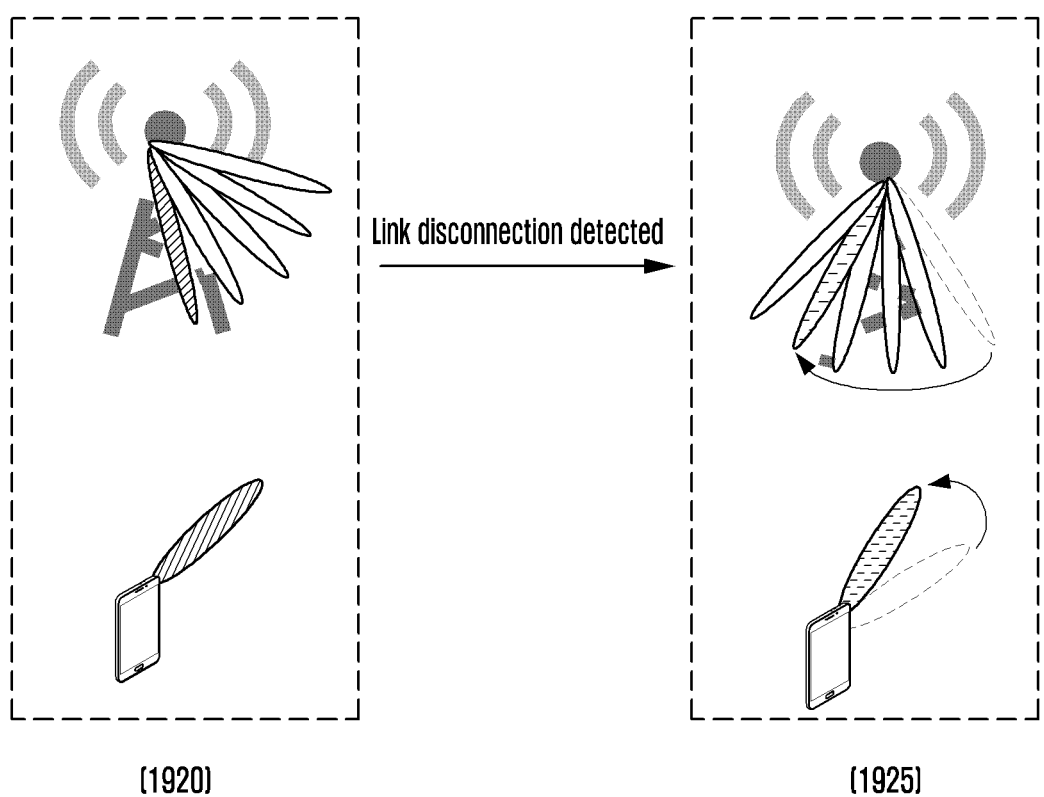
FIG. 19B illustrates RACH retransmission upon detection of a link breakage in a communication system supporting beamforming according to an embodiment of the present disclosure.

With reference to FIG. 19B, as indicated by indicia 1920, the terminal may transmit, using the optimal transmission beam, a random access preamble to a desired base station reception beam or via a desired RACH resource. For example, in the 5G system, the RACH subframe transmission period may be 5 ms or 10 ms, and the RACH retransmission period may be set by the base station and may be up to 10 ms.

Meanwhile, after transmitting a random access preamble, if a random access response (RAR) is not received during the RAR window (e.g., up to 10 ms), the terminal may retransmit the random access preamble. Here, the random access preamble may be retransmitted with increased power.

If the terminal fails to receive a RAR for a random access preamble repeatedly sent a preset number of times, or fails in the contention resolution during the contention-based RACH, the terminal may determine that the link is disconnected.

If a link disconnection is detected, as indicated by indicia 1925, the terminal may retransmit the random access preamble after changing the transmission beam for RACH retransmission, the base station reception beam for RACH reception, and the RACH resource. For example, the terminal may determine transmission and reception beams for RACH retransmission based on the stored inter-beam TPM information. As another example, the terminal may determine transmission and reception beams for RACH retransmission at random. Here, to use the changed beam for RACH retransmission, the retransmission power increment may be initialized before RACH retransmission.

Figure 20:
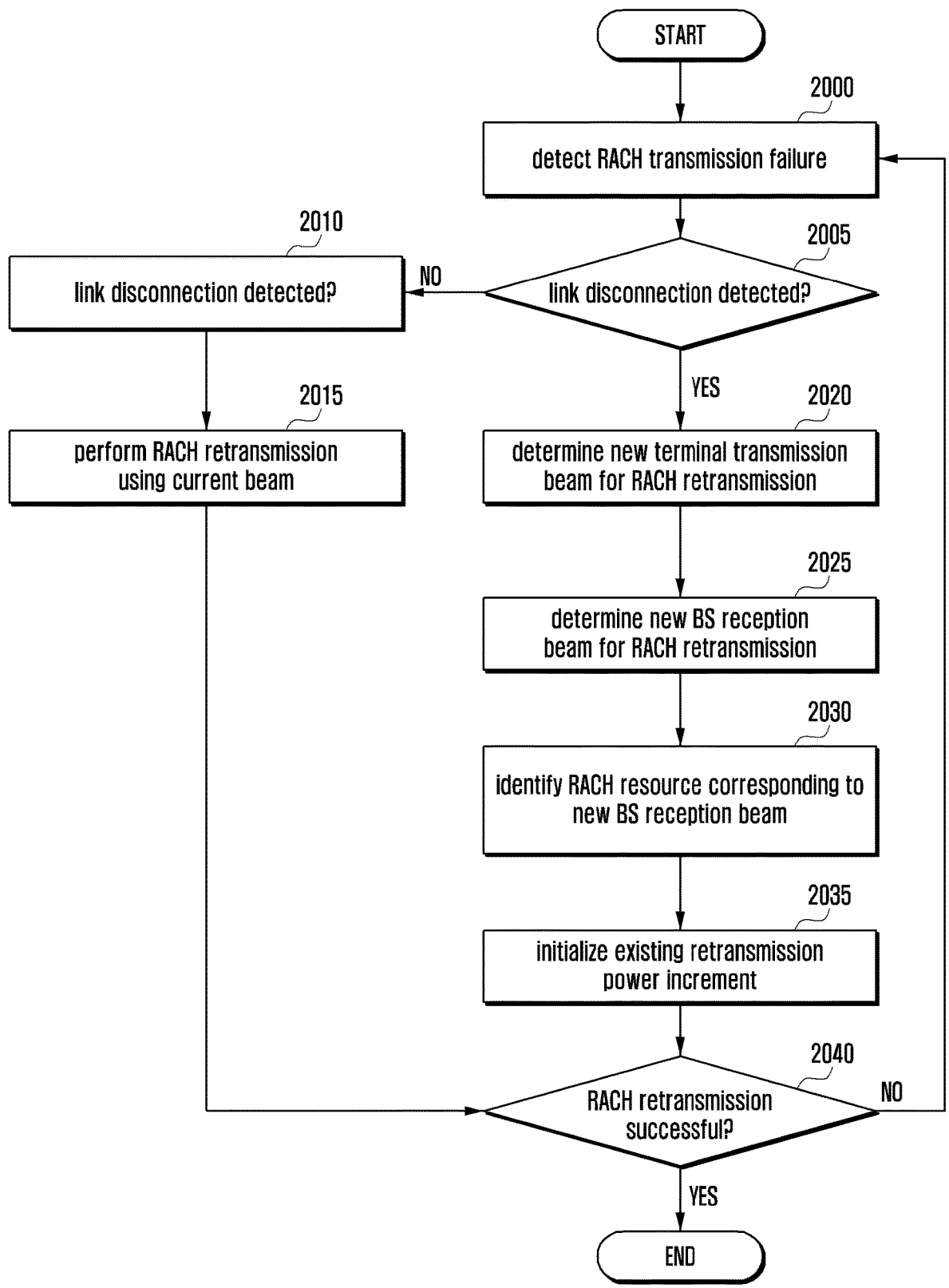
FIG. 20 is a flowchart illustrating RACH retransmission in a communication system supporting beamforming according to an embodiment of the present disclosure.

FIG. 20 is a flowchart illustrating RACH retransmission in a communication system supporting beamforming according to an embodiment of the present disclosure.

At step 2000, the terminal may detect a RACH transmission failure if a RAR is not received during the RAR window after transmitting a random access preamble. At step 2005, the terminal may determine whether the link is disconnected. For example, if RACH transmission fails repeatedly for a preset number of times or more, or if contention resolution fails in the contention-based RACH, the terminal may determine that the link is disconnected.

Upon determining that the link is not disconnected, at step 2010, the terminal may increase the retransmission power.

Increasing the retransmission power may be skipped. At step 2015, the terminal may retransmit the random access preamble with the increased retransmission power using the previously determined beam.

Upon determining that the link is disconnected, the terminal may perform steps 2020 to 2030. Here, the operations of steps 2020 to 2030 may be performed in any order. For RACH retransmission, the terminal may determine a new terminal transmission beam and base station reception beam and identify the RACH resource corresponding to the newly determined base station reception beam. At step 2035, the terminal may initialize the retransmission power increment. Initialization of the retransmission power increment may be skipped.

The terminal can retransmit the random access preamble using the newly determined transmission beam, reception beam, and RACH resource. Here, the random access preamble may be retransmitted using the initialized retransmission power. At step 2040, the terminal may determine whether RACH retransmission is successful by monitoring whether a RAR is received during the RAR window. If RACH retransmission is unsuccessful, the procedure returns to step 2000.

Meanwhile, the data retransmission operation based on beamforming can be applied to the Wi-Fi (e.g., IEEE 802.11 based) network.

In L2-layer retransmission based on IEEE 802.11, if an ACK frame is not received during the ACK timeout time (e.g., defined by SIFS (short interframe space)+slot time), the transmitting side determines that the transmission has failed and immediately prepares and performs the retransmission.

Figure 21:
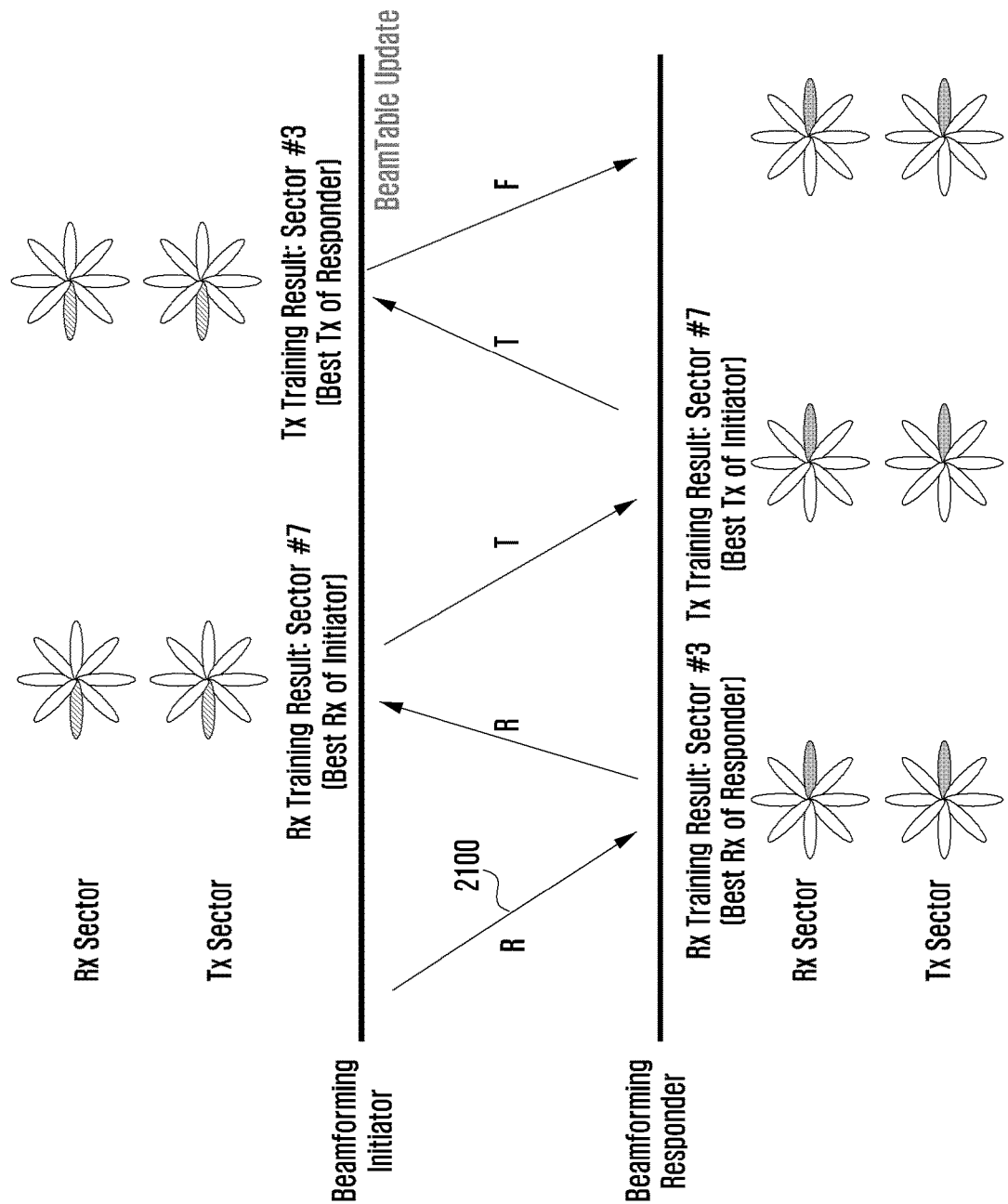
FIG. 21 illustrates a procedure for beam training using a beamforming frame.

FIG. 21 illustrates a procedure for beam training using a beamforming frame.

For example, in the case of an IEEE 802.11ad-based wireless network, an aperiodic beam training scheme may be adopted, separate frames for beam training may be defined, and a beam with the best signal quality may be determined through exchange of these frames.

To initiate the beam training process, the beamforming initiator sends a beamforming frame 2100 to the beamforming responder. Through exchange of beamforming frames, the beamforming initiator and the beamforming responder acquire optimal reception beam information first and then acquire optimal transmission beam information. The beamforming initiator notifies the last acquired transmission beam information of the beamforming responder to the beamforming responder.

In aperiodic beamforming, there is no fixed beamforming overhead, but beamforming itself cannot be initiated if a beamforming frame (e.g., beamforming frame 2100) does not reach the counterpart. Hence, the standard specifies that the beamforming frame is to be transmitted using the most robust MCS. Nevertheless, if an appropriate beam is not used, the beamforming frame may not be transmitted to the counterpart, the beam forming intention cannot be delivered to the counterpart, and thus beam forming itself cannot be performed.

Figure 22:
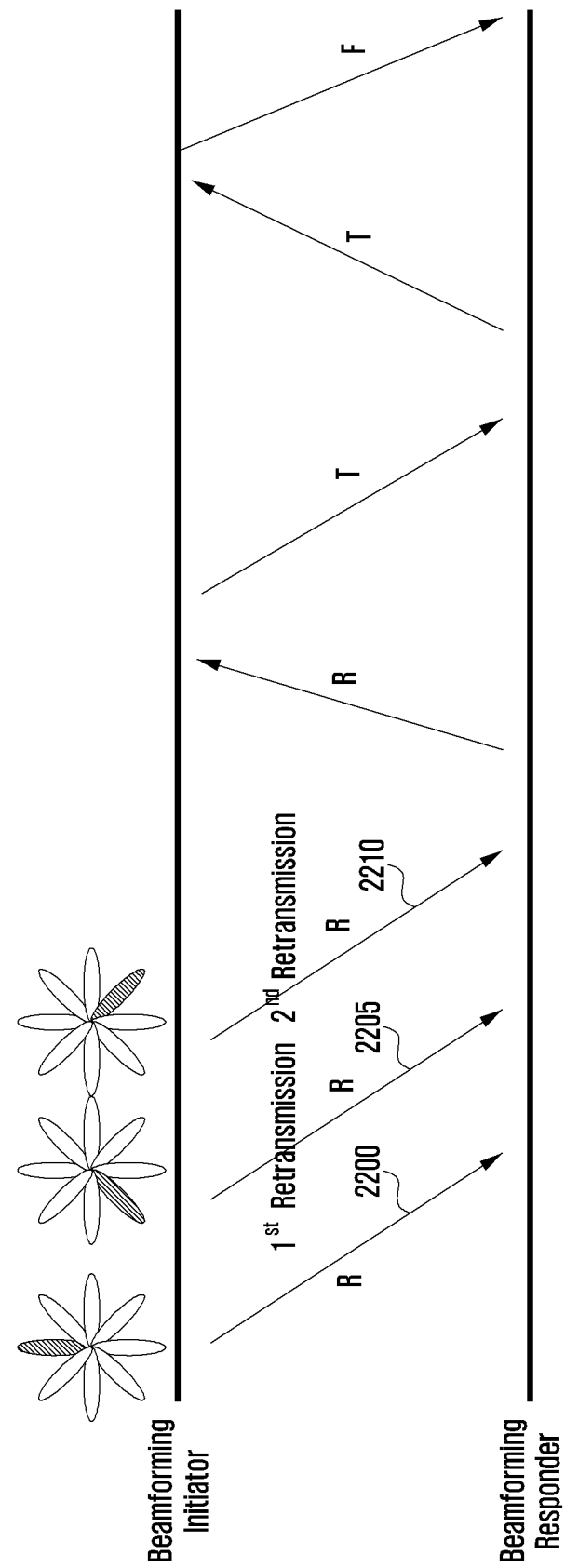
FIG. 22 illustrates a procedure for beam training using a beamforming frame according to an embodiment of the present disclosure.

FIG. 22 illustrates a procedure for beam training using a beamforming frame according to an embodiment of the present disclosure. Here, the beamforming frame may include a control message such as downlink control information (DCI) or uplink control information (UCI).

For example, in the beam training process using a beamforming frame in the IEEE 802.11ad-based wireless network, if the beamforming responder does not receive the first beamforming frame 2200, the entire beam training process may not be initiated. That is, in a situation where link deterioration or disconnection has already occurred due to an obstacle or terminal movement, if beam training is started using the optimal beam determined before the occurrence of the obstacle or terminal movement, the beam training may not be started.

In an embodiment of the present disclosure, the beamforming initiator may retransmit the beamforming frame 2205 and the beamforming frame 2210 until transmission of the beamforming frame is successful. For beamforming frame retransmission, the beamforming initiator can determine a new beam for retransmission on the basis of the stored inter-beam TPM information. Thereby, it is possible to increase the beam training success rate.

Figure 23:
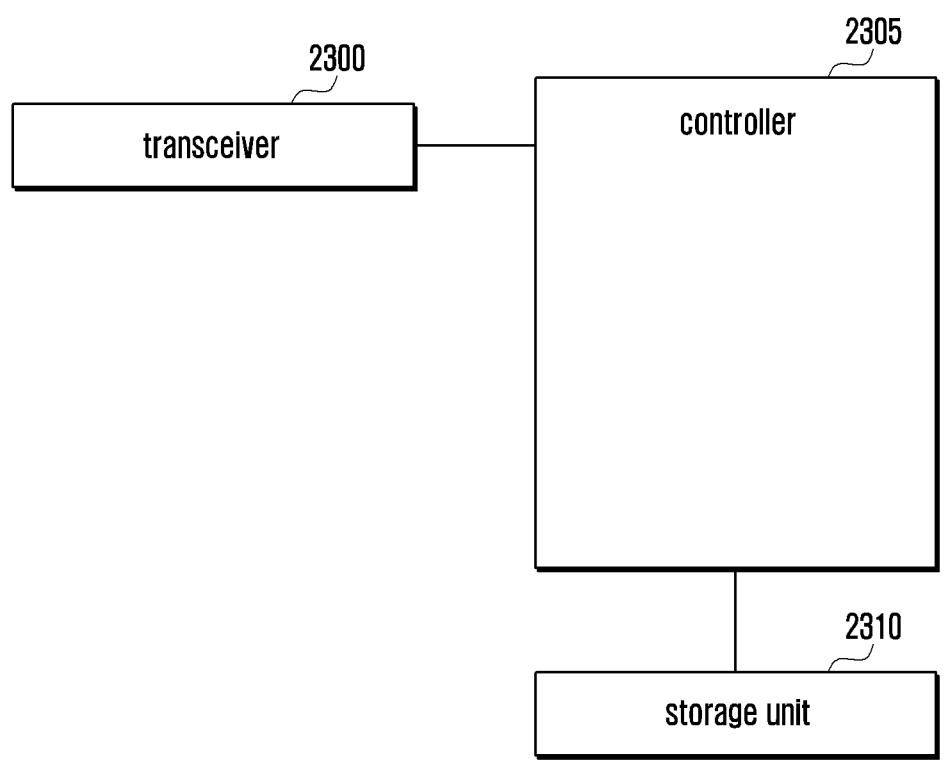
FIG. 23 is a schematic block diagram of a base station according to an embodiment of the present disclosure.

FIG. 23 is a schematic block diagram of a base station according to an embodiment of the present disclosure.

The base station may include a transceiver 2300, a controller 2305, and a storage unit 2310.

The transceiver 2300 may be electrically connected to the controller 2305, and can transmit and receive a signal to and from an external device (e.g., terminal) under the control of the controller 2305.

The storage unit 2310 may be electrically connected to the controller 2305, and may store an operating system and other application programs in the program region, and may store various data in the data region. For example, the storage unit 2310 may store the learned inter-beam TPM information in the data region.

The controller 2305 may control base station operations according to various embodiments of the present disclosure described before.

For example, the controller 2305 may control the terminal to perform beam training by transmitting a reference signal (e.g., BRS or BRRS).

When the base station operates as a data transmitting end, the controller 2305 may transmit data at least once using a first beam and detect a link disconnection within the retransmission request interval at the MAC layer. The retransmission period at the MAC layer may include at least one of the HARQ retransmission period and the RACH retransmission period.

The controller 2305 may detect the link disconnection on the basis of at least one of whether a response to the data transmitted is received and the number of times a response is received. For example, when a NACK is not received a given number of times, the controller 2305 may determine that the link is disconnected. When the NACK is successfully received, if the RV transmission for the data fails, the controller 2305 may determine that the link is disconnected. Alternatively, if the number of data transmissions using the first beam is greater than or equal to a preset threshold, the controller 2305 may determine that the link is disconnected. When a link disconnection is detected, the controller 2305 may determine a second beam and control retransmission of the data using the second beam. For example, the controller 2305 may determine the second beam on the basis of the candidate beam information received from the terminal as a result of beam training. As another example, the controller 2305 may determine the second beam on the basis of the stored inter-beam TPM information.

The controller 2305 may update the inter-beam transition probability matrix information on the basis of whether the retransmission beam prediction using the inter-beam transition probability matrix information is successful or the result of beam training. The controller 2305 may manage separate pieces of inter-beam TPM information for different regions in the coverage of the base station, and update the inter-beam TPM information in response to at least one terminal connected to the base station. The inter-beam TPM information can be applied to one or more terminals connected to the base station.

Figure 24:
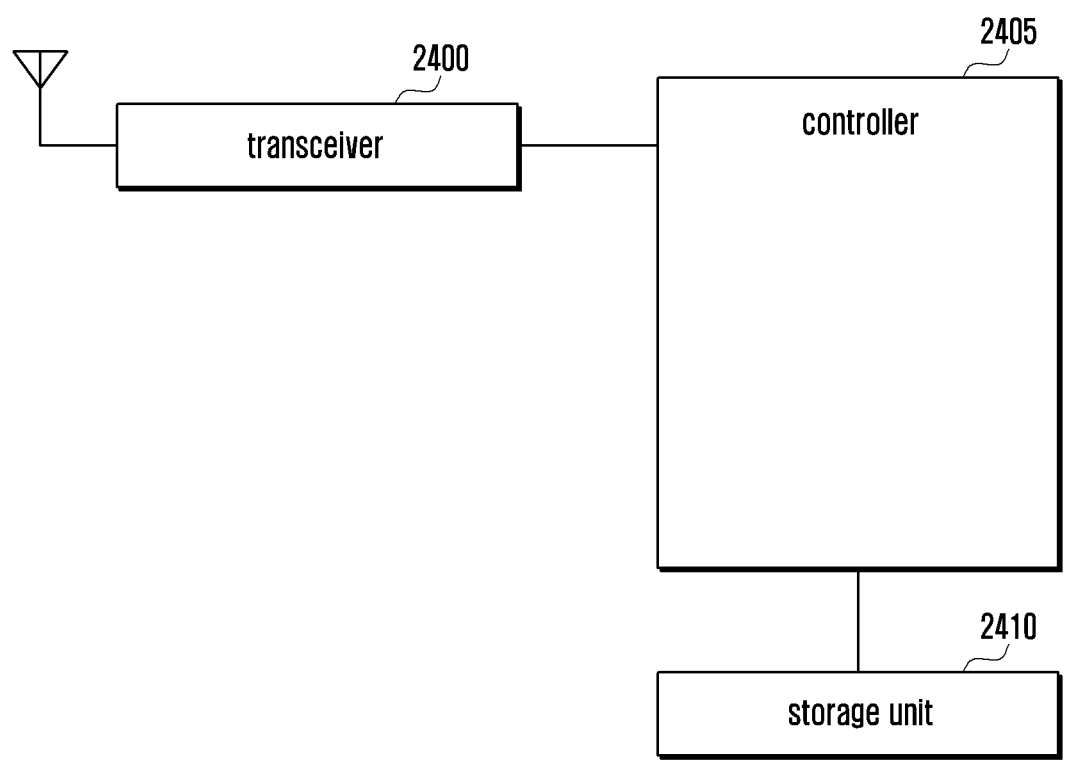
FIG. 24 is a schematic block diagram of a terminal according to an embodiment of the present disclosure.

FIG. 24 is a schematic block diagram of a terminal according to an embodiment of the present disclosure.

The terminal may include a transceiver 2400, a controller 2405, and a storage unit 2410.

The transceiver 2400 may be electrically connected to the controller 2405, and can transmit and receive a signal to and from an external device (e.g., base station) under the control of the controller 2405.

The storage unit 2410 may be electrically connected to the controller 2405, and may store an operating system and other application programs in the program region and may store various data in the data region. For example, the storage unit 2410 may store the learned inter-beam TPM information in the data region.

The controller 2405 may control terminal operations according to various embodiments of the present disclosure described before.

For example, the controller 2405 may receive a reference signal (e.g., BRS or BRRS) and obtain optimal beam pair information and candidate beam pair information through beam training. The controller 2405 may control transmission of the information obtained as a result of beam training to the base station.

When the terminal operates as a data transmitting end, the controller 2405 may transmit data at least once using a first beam and detect a link disconnection within the retransmission request interval at the MAC layer. The retransmission period at the MAC layer may include at least one of the HARQ retransmission period and the RACH retransmission period.

The controller 2405 may detect the link disconnection on the basis of at least one of whether a response to the data transmitted is received and the number of times a response is received.

For example, when a NACK is not received a given number of times, the controller 2405 may determine that the link is disconnected. When the NACK is successfully received, if the RV transmission for the data fails, the controller 2405 may determine that the link is disconnected. Alternatively, if the number of data transmissions using the first beam is greater than or equal to a preset threshold, the controller 2405 may determine that the link is disconnected.

Additionally, if RACH transmission fails repeatedly for a preset number of times or more, or if contention resolution fails in the contention-based RACH, the controller 2405 may determine that the link is disconnected.

When a link disconnection is detected, the controller 2405 may determine a second beam and control retransmission of the data using the second beam. For example, the controller 2405 may determine the second beam on the basis of the candidate beam information received from the terminal as a result of beam training. As another example, the controller 2405 may determine the second beam on the basis of the stored inter-beam TPM information.

The controller 2405 may update the inter-beam transition probability matrix information on the basis of whether the retransmission beam prediction using the inter-beam transition probability matrix information is successful or the result of beam training. In addition, the controller 2405 may adjust the inter-beam transition probability according to whether the terminal is in a high mobility state. For example, in computing the probability of transition from beam i to beam j, if the terminal is in a high mobility state, to improve the real-time adaptability, the weight of the uncorrelated factor between beam i and beam j may be increased and the weight of the total count of transitions from beam i to beam j within a preset window may be decreased. On the other hand, if the terminal is not in a high mobility state, to improve the learning-based adaptability, the weight of the uncorrelated factor between beam i and beam j may be decreased and the weight of the total count of transitions from beam i to beam j within a preset window may be increased.

In various embodiments of the present disclosure, each component of the electronic device described above may be composed of one or more elements, and component names may be varied according to the type of the electronic device. The electronic device may be configured to include at least one of the aforementioned components, and an existing component may be omitted and a new component may be added. Some of the components of the electronic device may be combined into one entity while maintaining the same functionality.

In the present disclosure, the terms "unit", "device" and "module" may refer to a certain unit that includes one of hardware, software and firmware, or any combination thereof. The term "module" may be interchangeably used with "unit", "logic", "logical block", "component", or "circuit". The module may be the minimum unit of a single-bodied component or a part thereof. The module may be the minimum unit, or a part thereof, which performs one or more particular functions. The module may be realized mechanically or electronically. For example, the module may include at least one of an ASIC (application-specific integrated circuit) chip, an FPGAs (field-programmable gate arrays), and a programmable-logic device, which have been known or are to be developed.

Hereinabove, various embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

What is claimed is:

1. A method of retransmission for a base station in a wireless communication system supporting beamforming, the method comprising:
    transmitting data at least once using a first beam;
    detecting a link disconnection within a retransmission request interval at a media access control (MAC) layer;
    determining, when a link disconnection is detected, a second beam; and
    retransmitting the data using the second beam,
    wherein determining the second beam comprises at least one of:
    determining the second beam on the basis of candidate beam information received from a terminal as a result of beam measuring; and/or
    determining the second beam on the basis of stored inter-beam transition probability matrix (TPM) information.

2. The method of claim 1, wherein the retransmission request interval at the MAC layer comprises at least one of a hybrid automatic repeat request (HARQ) retransmission period and a random access channel (RACH) retransmission period.

3. The method of claim 1, wherein detecting the link disconnection comprises detecting the link disconnection on the basis of at least one of whether a response to the data transmitted at least once is received and a number of times of receiving the response.

4. The method of claim 1, wherein the inter-beam TPM information is updated on the basis of whether a retransmission beam prediction using the inter-beam TPM information is successful or the result of beam training, wherein the inter-beam TPM information is managed separately for each of different regions in coverage of the base station,
   wherein the inter-beam TPM information is updated in response to at least one terminal connected to the base station, and
   wherein the inter-beam TPM information is applied to one or more terminals connected to the base station.

5. A method of retransmission for a terminal in a wireless communication system supporting beamforming, the method comprising:
   transmitting data at least once using a first beam;
   detecting a link disconnection within a retransmission request interval at a media access control (MAC) layer;
   determining, when a link disconnection is detected, a second beam; and
   retransmitting the data using the second beam,
   wherein determining the second beam comprises at least one of:
   determining the second beam on the basis of candidate beam information obtained as a result of beam measuring; and/or
   determining the second beam on the basis of stored inter-beam transition probability matrix (TPM) information.

6. The method of claim 5, wherein the retransmission request interval at the MAC layer comprises at least one of a hybrid automatic repeat request (HARQ) retransmission period and a random access channel (RACH) retransmission period.

7. The method of claim 5, wherein detecting the link disconnection comprises detecting the link disconnection on the basis of at least one of whether a response to the data transmitted at least once is received and a number of times of receiving the response.

8. The method of claim 5, wherein the inter-beam TPM information is updated on the basis of whether a retransmission beam prediction using the inter-beam TPM information is successful or the result of beam training, and
   wherein the inter-beam TPM information is based on mobility of the terminal.

9. A base station in a wireless communication system supporting beamforming, comprising:
   a transceiver configured to send and receive a signal; and
   a controller configured to control transmitting data at least once using a first beam, detecting a link disconnection within a retransmission request interval at a media access control (MAC) layer, determining, when a link disconnection is detected, a second beam on the basis of candidate beam information received from a terminal as a result of beam measuring and/or stored inter-beam transition probability matrix (TPM) information, and retransmitting the data using the second beam.

10. The base station of claim 9, wherein the retransmission request interval at the MAC layer comprises at least one of a hybrid automatic repeat request (HARQ) retransmission period and a random access channel (RACH) retransmission period.

11. The base station of claim 9, wherein the controller is further configured to detect the link disconnection on the basis of at least one of whether a response to the data transmitted at least once is received and a number of times of receiving the response.

12. The base station of claim 9, wherein the inter-beam TPM information is updated on the basis of whether a retransmission beam prediction using the inter-beam TPM information is successful or the result of beam training,
   wherein the inter-beam TPM information is managed separately for each of different regions in coverage of the base station,
   wherein the inter-beam TPM information is updated in response to at least one terminal connected to the base station, and
   wherein the inter-beam TPM information is applied to one or more terminals connected to the base station.

13. A terminal in a wireless communication system supporting beamforming, comprising:
   a transceiver configured to send and receive a signal; and
   a controller configured to control transmitting data at least once using a first beam, detecting a link disconnection within a retransmission request interval at a media access control (MAC) layer, determining, when a link disconnection is detected, a second beam on the basis of candidate beam information received from a terminal as a result of beam measuring and/or stored inter-beam transition probability matrix (TPM) information, and retransmitting the data using the second beam.

14. The terminal of claim 13, wherein the retransmission request interval at the MAC layer comprises at least one of a hybrid automatic repeat request (HARM) retransmission period and a random access channel (RACH) retransmission period.

15. The terminal of claim 13, wherein the controller is further configured to detect the link disconnection on the basis of at least one of whether a response to the data transmitted at least once is received and a number of times of receiving the response.

16. The terminal of claim 13, wherein the inter-beam TPM information is updated on the basis of whether a retransmission beam prediction using the inter-beam TPM information is successful or the result of beam training, and
   wherein the inter-beam TPM information is based on mobility of the terminal.

* * * * *